(12) United States Patent
Lah

(10) Patent No.: US 10,982,463 B2
(45) Date of Patent: Apr. 20, 2021

(54) TENTS

(71) Applicant: Dongah Aluminum Corporation, Incheon (KR)

(72) Inventor: Jeh-Kun Lah, Seoul (KR)

(73) Assignee: Dongah Aluminum Corporation, Incheon (KR)

( * ) Notice: Subject to any disclaimer, the term of this patent is extended or adjusted under 35 U.S.C. 154(b) by 0 days.

(21) Appl. No.: 16/632,251

(22) PCT Filed: Aug. 6, 2018

(86) PCT No.: PCT/KR2018/008888
§ 371 (c)(1),
(2) Date: Jan. 17, 2020

(87) PCT Pub. No.: WO2019/031784
PCT Pub. Date: Feb. 14, 2019

(65) Prior Publication Data
US 2020/0165836 A1    May 28, 2020

(30) Foreign Application Priority Data
Aug. 8, 2017    (KR) .......................... 10-2017-0100213

(51) Int. Cl.
*E04H 15/40*    (2006.01)
*E04H 15/26*    (2006.01)
*F16B 2/18*     (2006.01)
*F16B 7/04*     (2006.01)
*E04H 15/32*    (2006.01)

(52) U.S. Cl.
CPC ........... *E04H 15/405* (2013.01); *E04H 15/26* (2013.01); *F16B 2/185* (2013.01); *F16B 7/0493* (2013.01); *E04H 2015/326* (2013.01)

(58) Field of Classification Search
CPC .............................. E04H 15/425; E04H 15/40
See application file for complete search history.

(56) References Cited

U.S. PATENT DOCUMENTS 4,265,259 A * 5/1981 Gillis ................... E04H 15/425
                                                    135/115
5,080,119 A * 1/1992 Scherer ................ E04H 15/425
                                                    135/127
(Continued)

FOREIGN PATENT DOCUMENTS

GB        2422153 A  *  7/2006  ............. E04H 15/40
JP     2016-149979 A      8/2016
(Continued)

OTHER PUBLICATIONS

English language machine translation of Korean Patent Application Publication No. 10-1995-0001051, Jan. 3, 1995.
(Continued)

*Primary Examiner* — Noah Chandler Hawk
(74) *Attorney, Agent, or Firm* — Dascenzo Gates Intellectual Property Law, P.C.

(57) ABSTRACT

Tents are disclosed herein. A tent includes a plurality of support frames, each support frame being bent in a shape of an arch and having two ends configured to be fixed on a ground surface when the tent is assembled. Each support frame crosses over at least one other support frame when the tent is assembled. Each support frame is positioned such that the ends of the support frame are positioned on non-adjacent vertices of a polygonal base surface when the tent is assembled.

22 Claims, 15 Drawing Sheets

(56) References Cited

U.S. PATENT DOCUMENTS

| | | | |
|---|---|---|---|
| 5,117,852 A | 6/1992 | Bryant | |
| 5,439,017 A * | 8/1995 | Brown | E04H 15/40 |
| | | | 135/121 |
| 5,651,633 A * | 7/1997 | Howe | E04H 15/64 |
| | | | 135/135 |
| 5,797,411 A | 8/1998 | Parker | |
| 6,415,806 B1 * | 7/2002 | Gillis | E04H 15/425 |
| | | | 135/124 |
| 7,004,183 B2 * | 2/2006 | Gillis | E04H 15/40 |
| | | | 135/119 |
| 8,602,044 B2 * | 12/2013 | Zemitis | E04H 15/44 |
| | | | 135/124 |
| 2009/0173369 A1 * | 7/2009 | Lah | E04H 15/425 |
| | | | 135/121 |

FOREIGN PATENT DOCUMENTS

| | | |
|---|---|---|
| KR | 10-1995-0001051 | 1/1995 |
| KR | 20-0359060 Y1 | 8/2004 |
| KR | 10-0906193 B1 | 7/2009 |
| KR | 10-0954952 B1 | 4/2010 |
| KR | 10-1110554 B1 | 1/2012 |
| KR | 10-1277160 B1 | 6/2013 |
| KR | 10-1823079 B1 | 1/2018 |
| WO | WO 2010/087557 A1 | 8/2010 |

OTHER PUBLICATIONS

English language machine translation of Korean Utility Model No. 20-0359060, Aug. 16, 2004.
English language machine translation of Korean Patent No. 10-0954952, Apr. 27, 2010.
English language machine translation of Korean Patent No. 10-1110554, Jan. 31, 2012.
English language machine translation of Korean Patent No. 10-1277160, Jun. 20, 2013.
English language machine translation of Korean Patent No. 10-1823079, Jan. 29, 2018.
English language machine translation of Japan Patent Application Publication No. 2016-149979 A.

* cited by examiner

[Fig. 1]
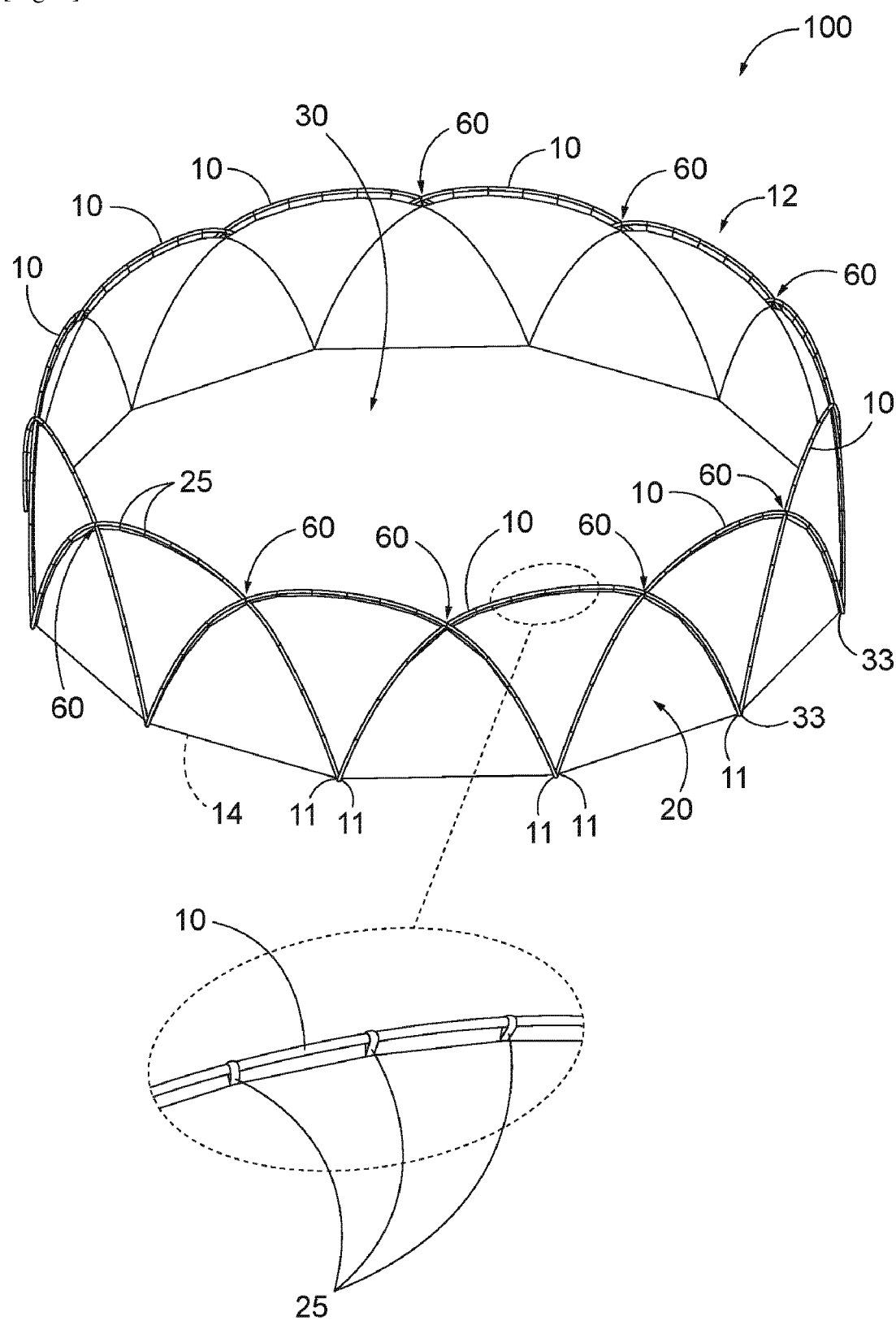

[Fig. 2]
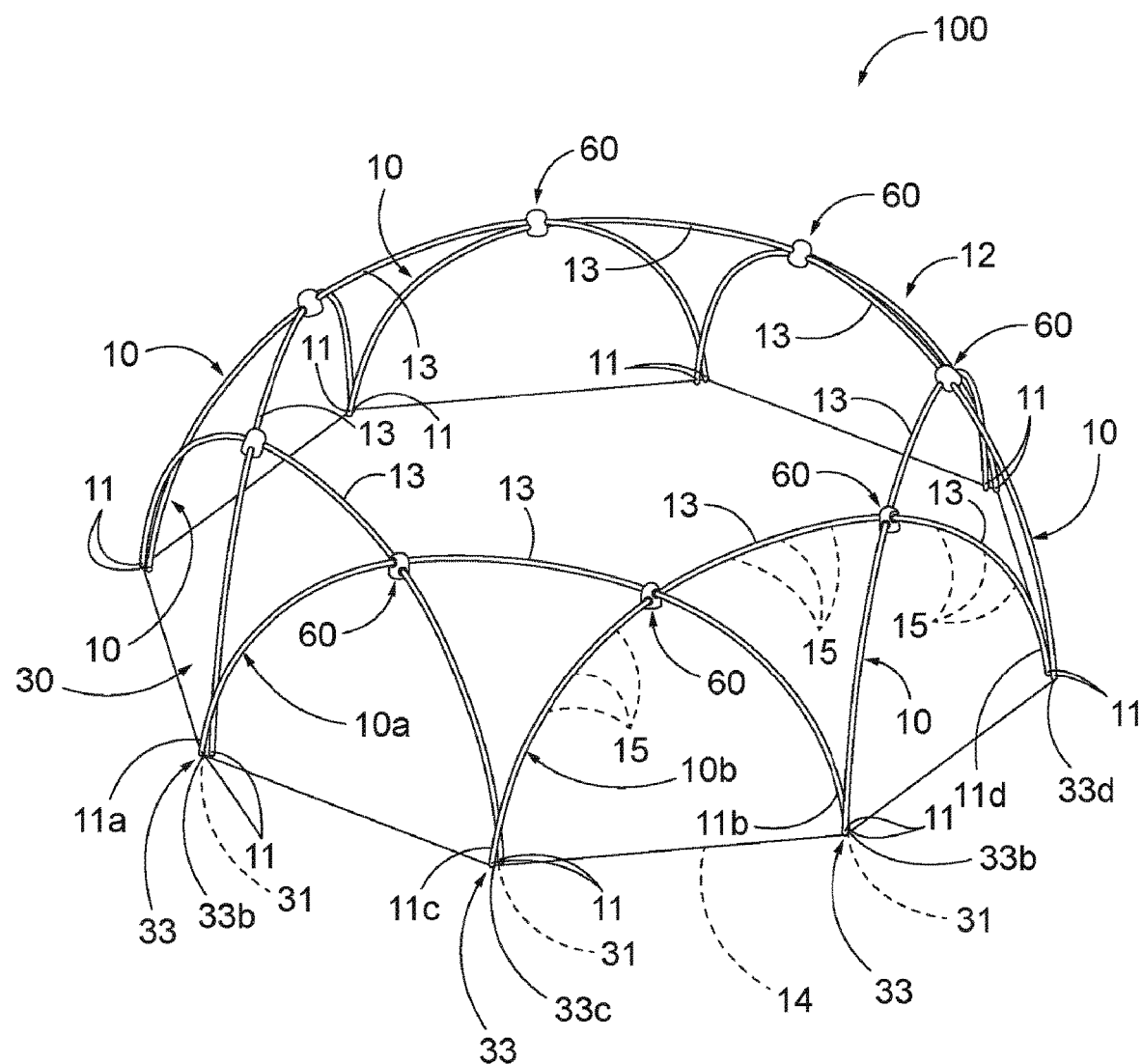

[Fig. 3a]
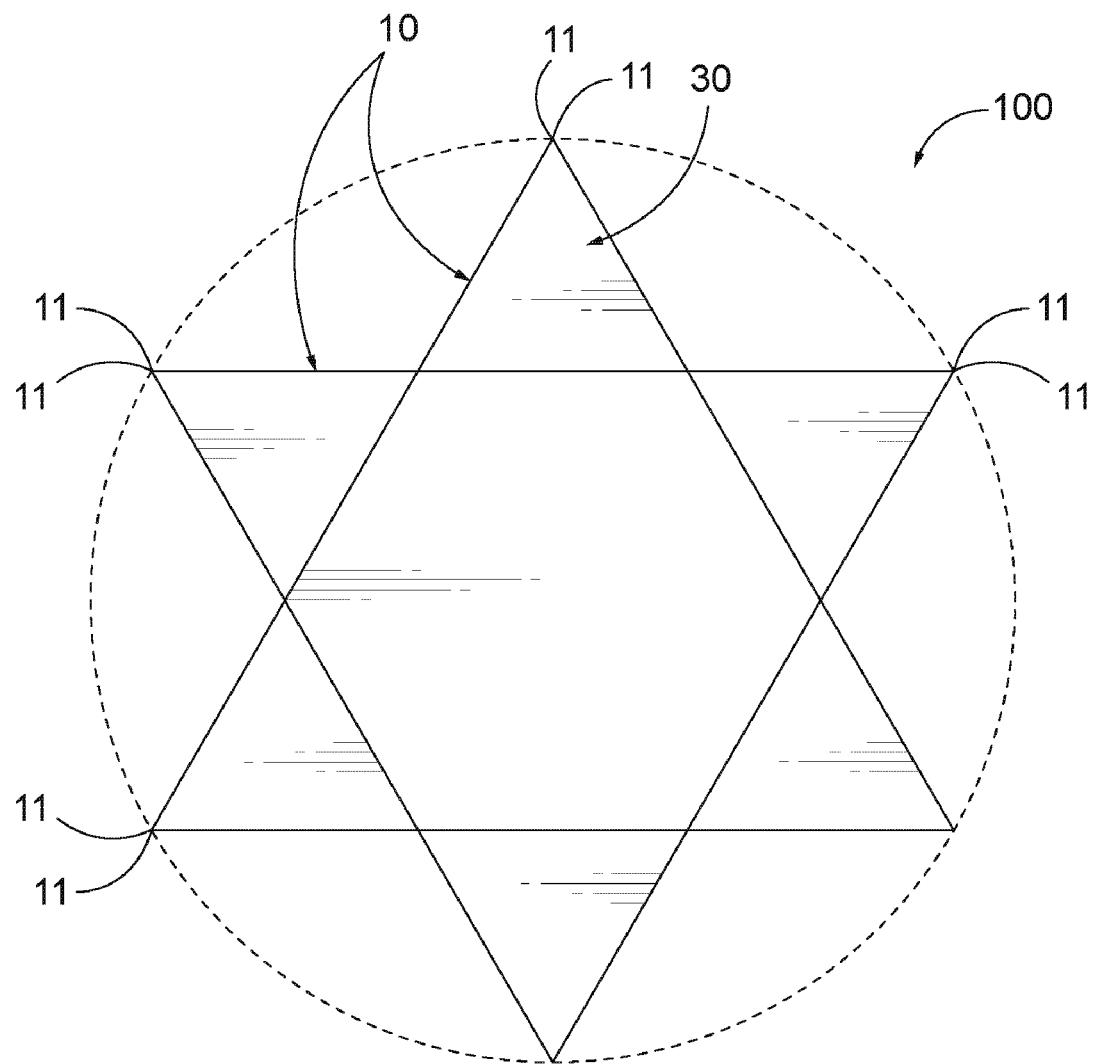

[Fig. 3b]
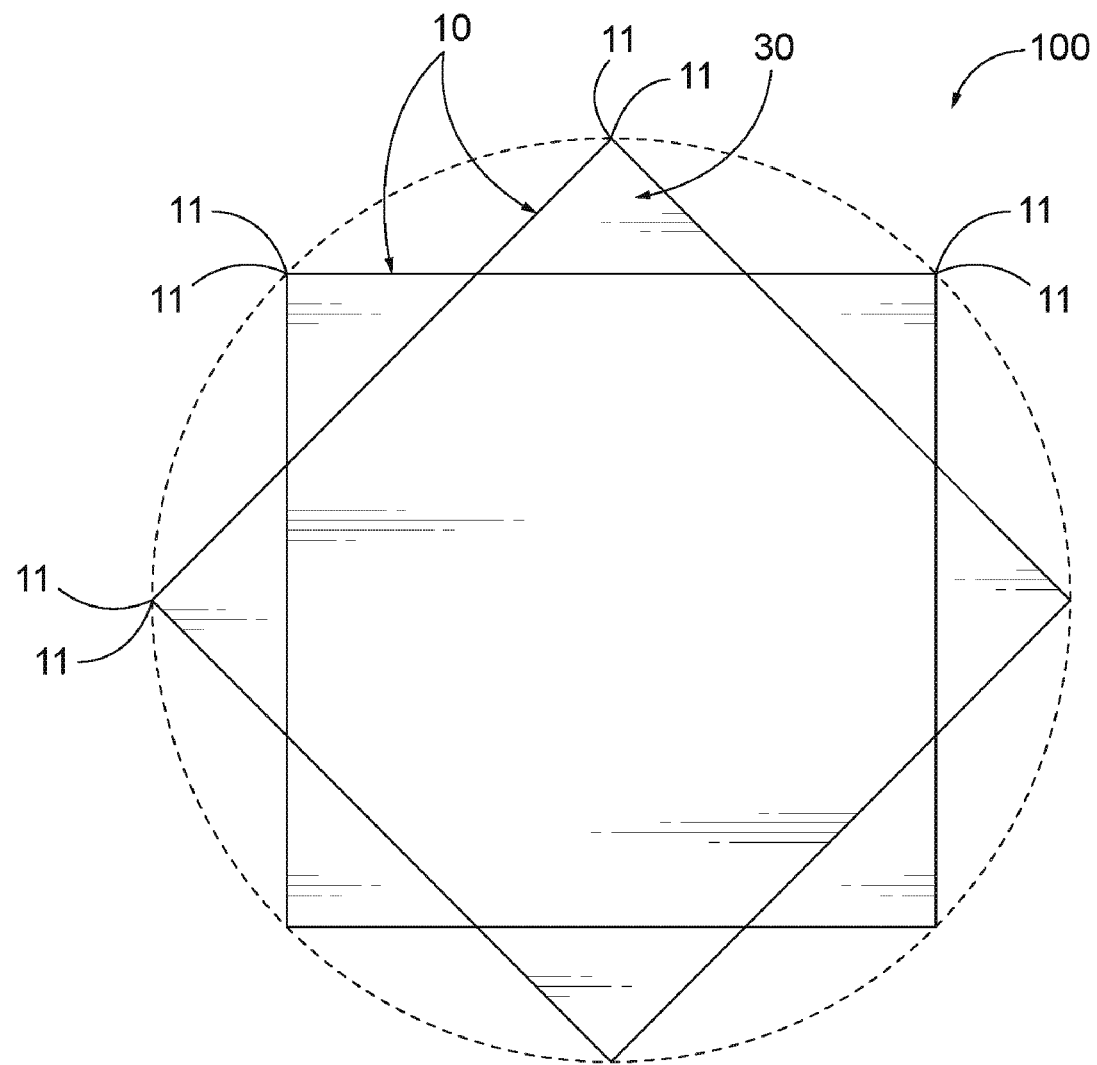

[Fig. 3c]
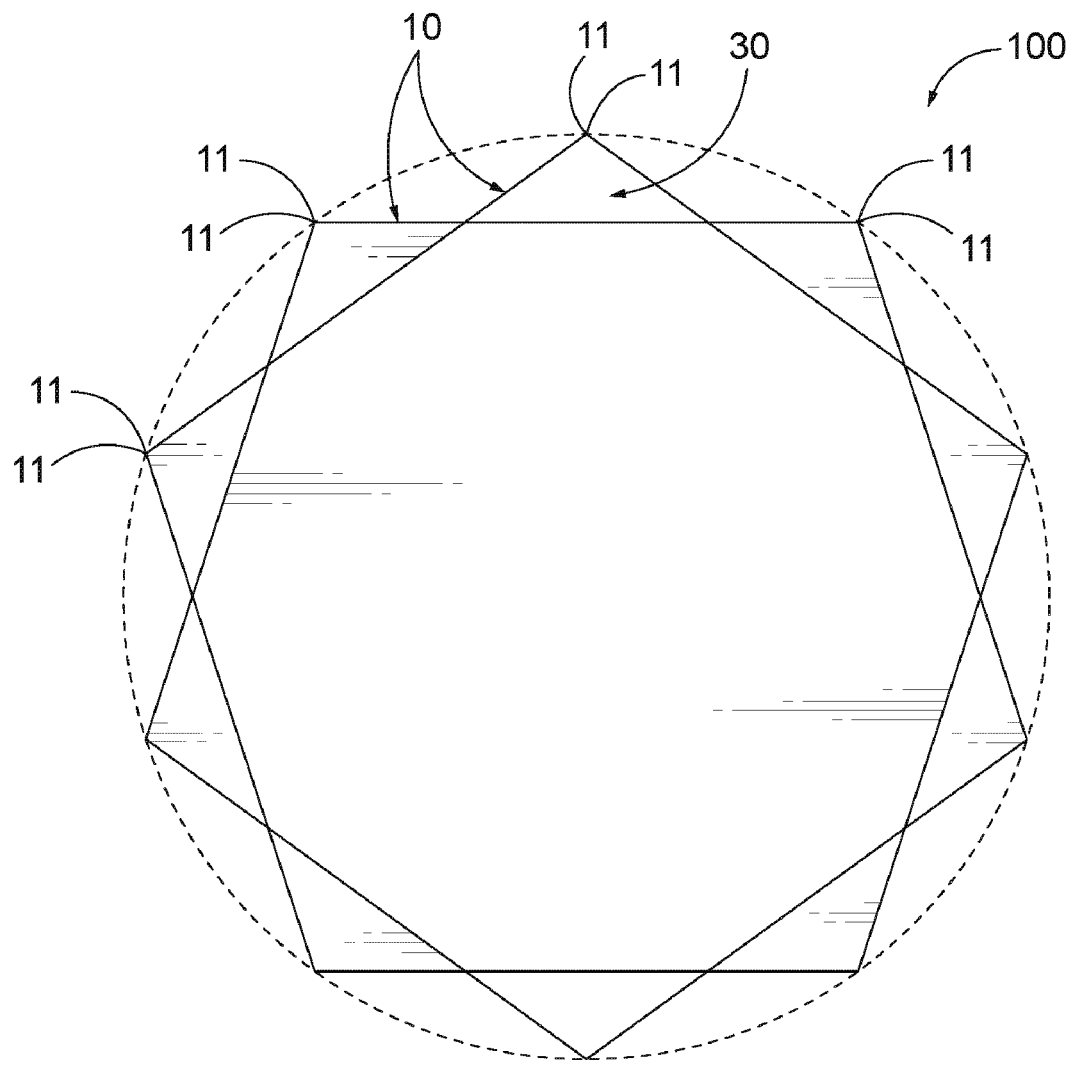

[Fig. 3d]
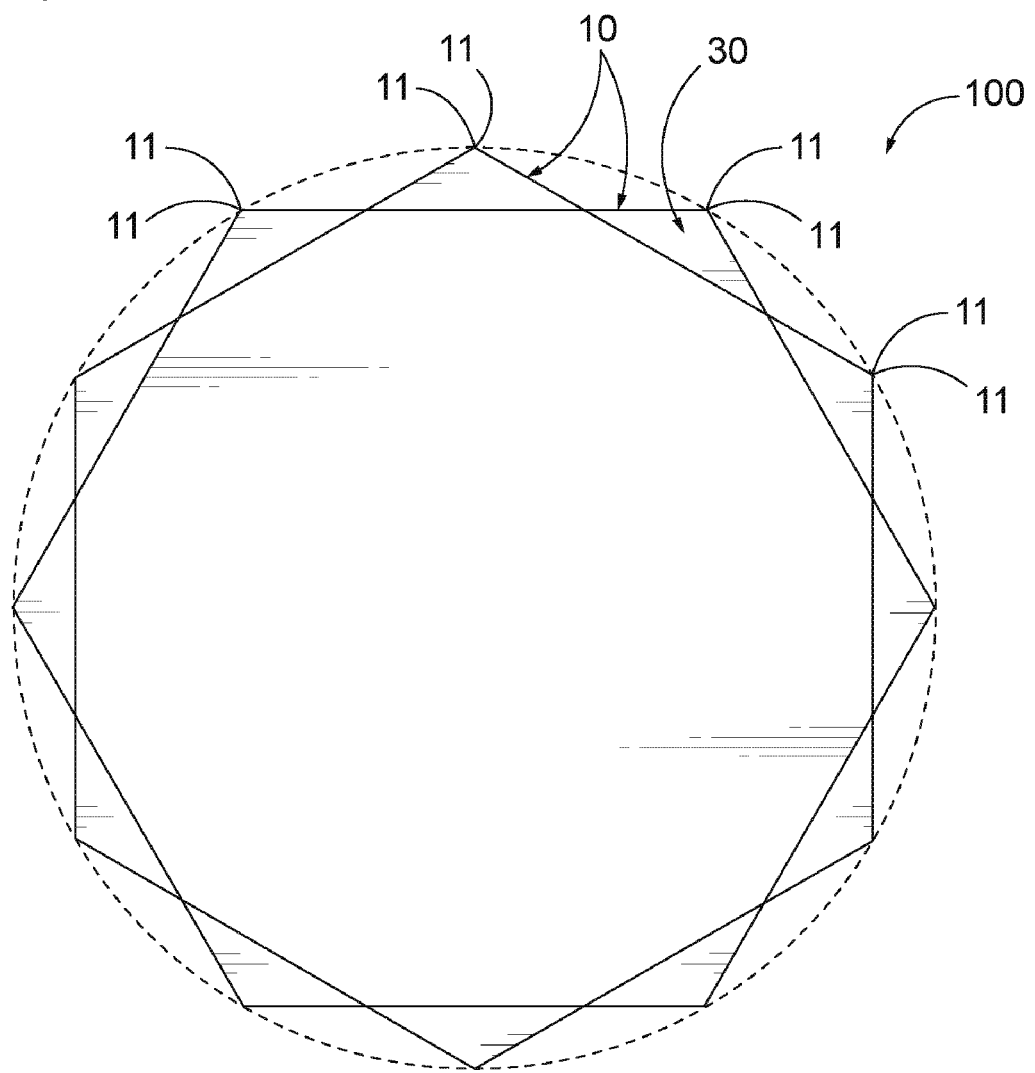

[Fig. 4a]
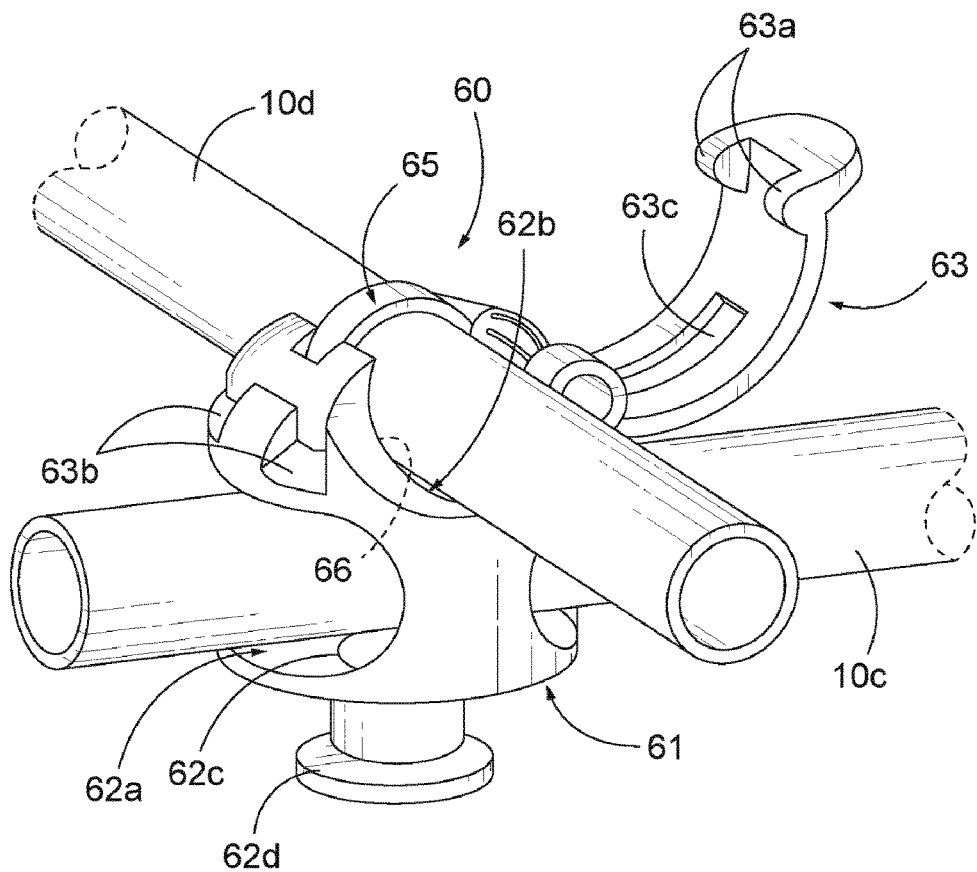
[Fig. 4b]
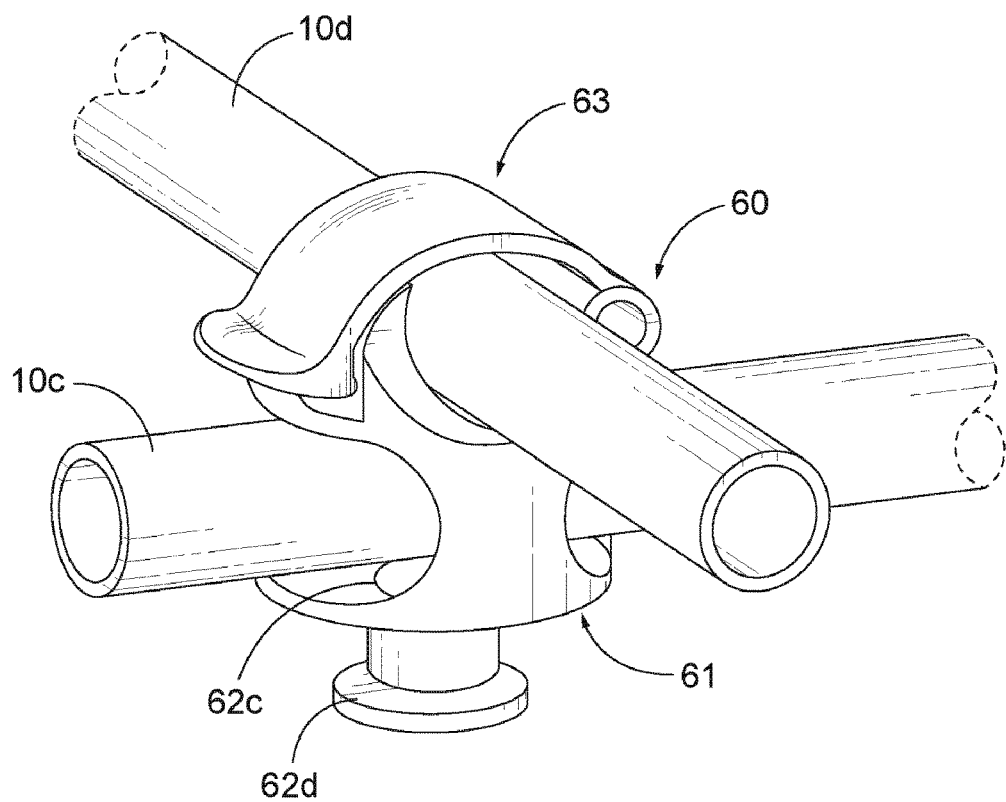

[Fig. 5]
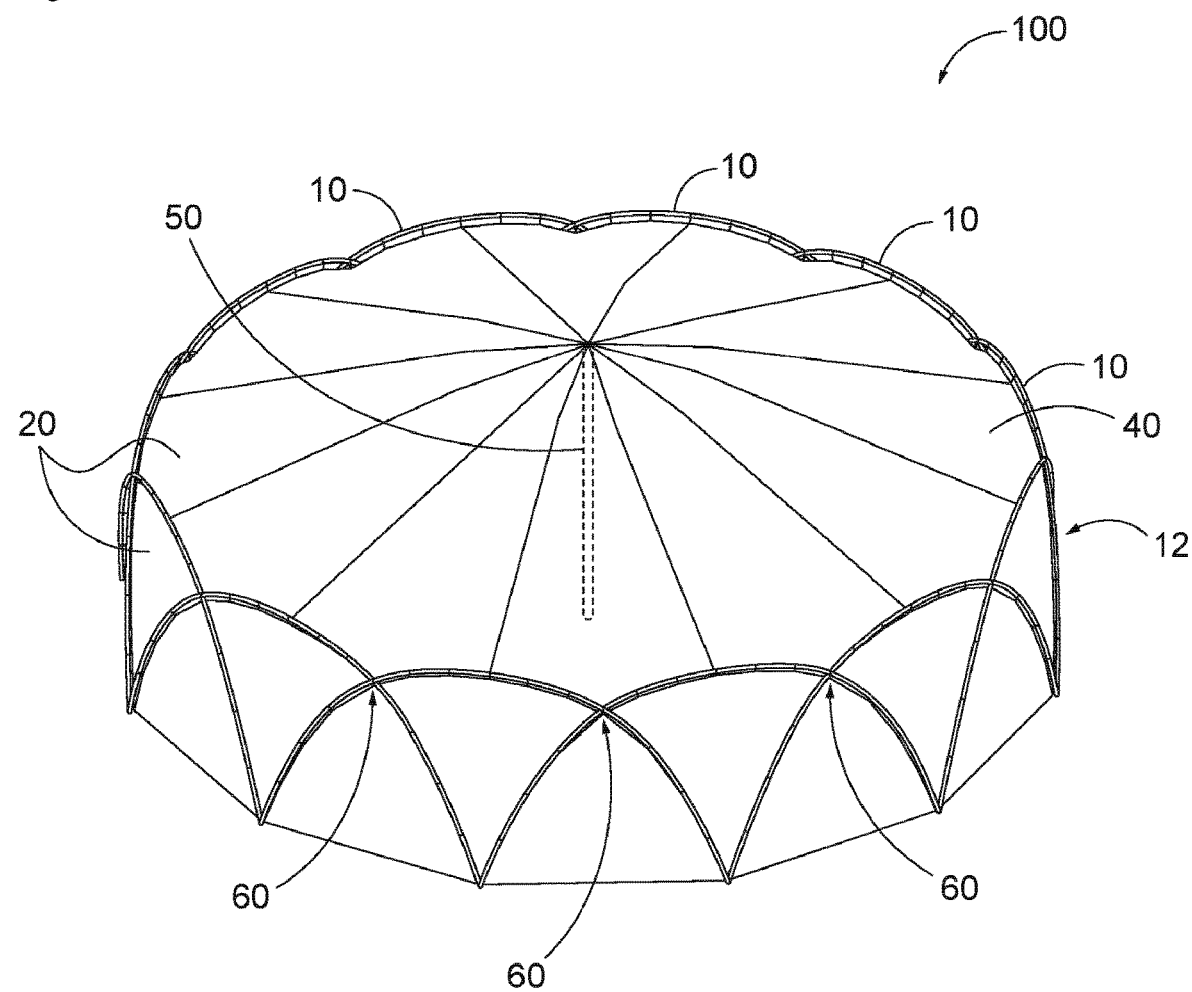

[Fig. 6]
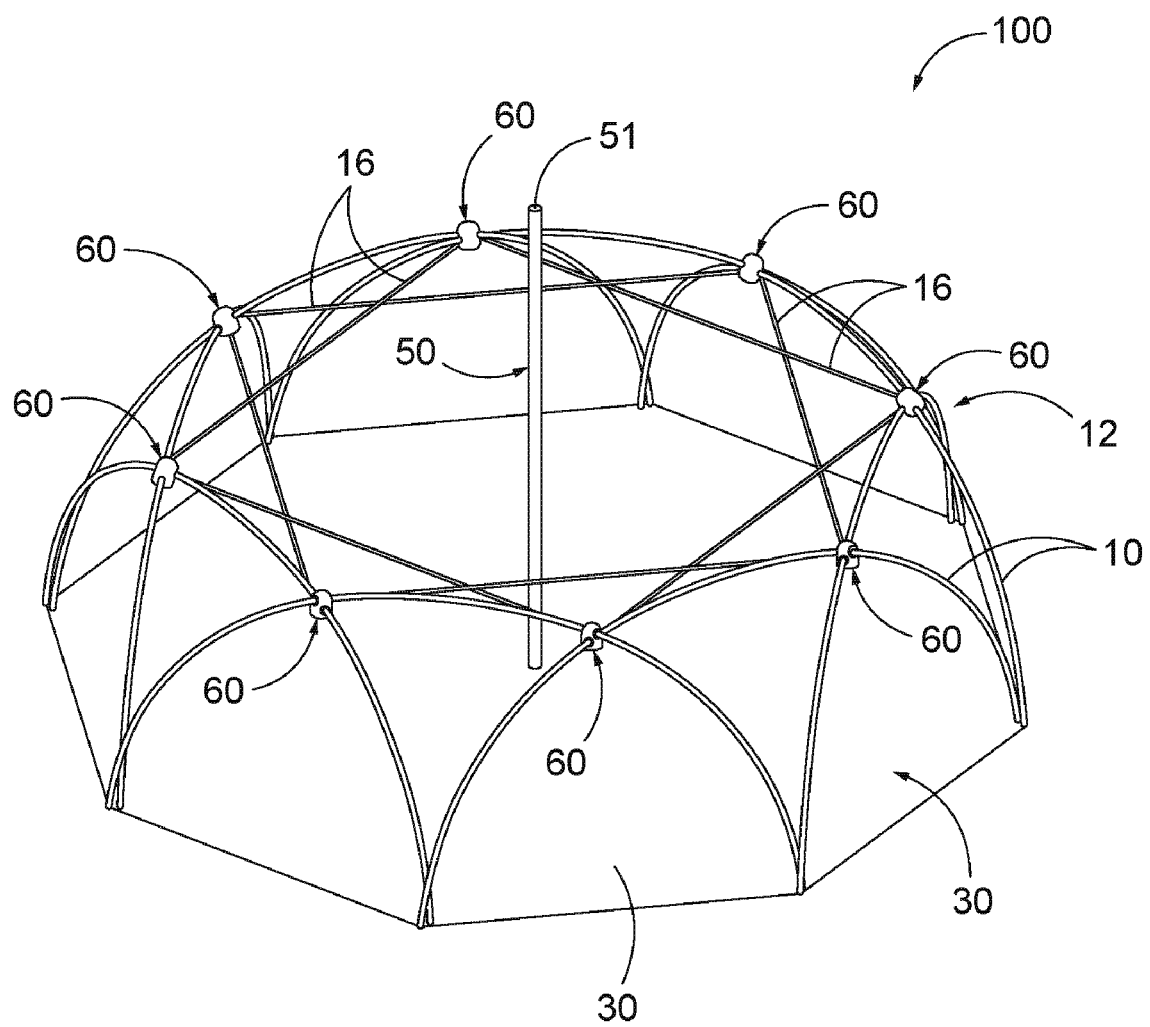

[Fig. 7a]
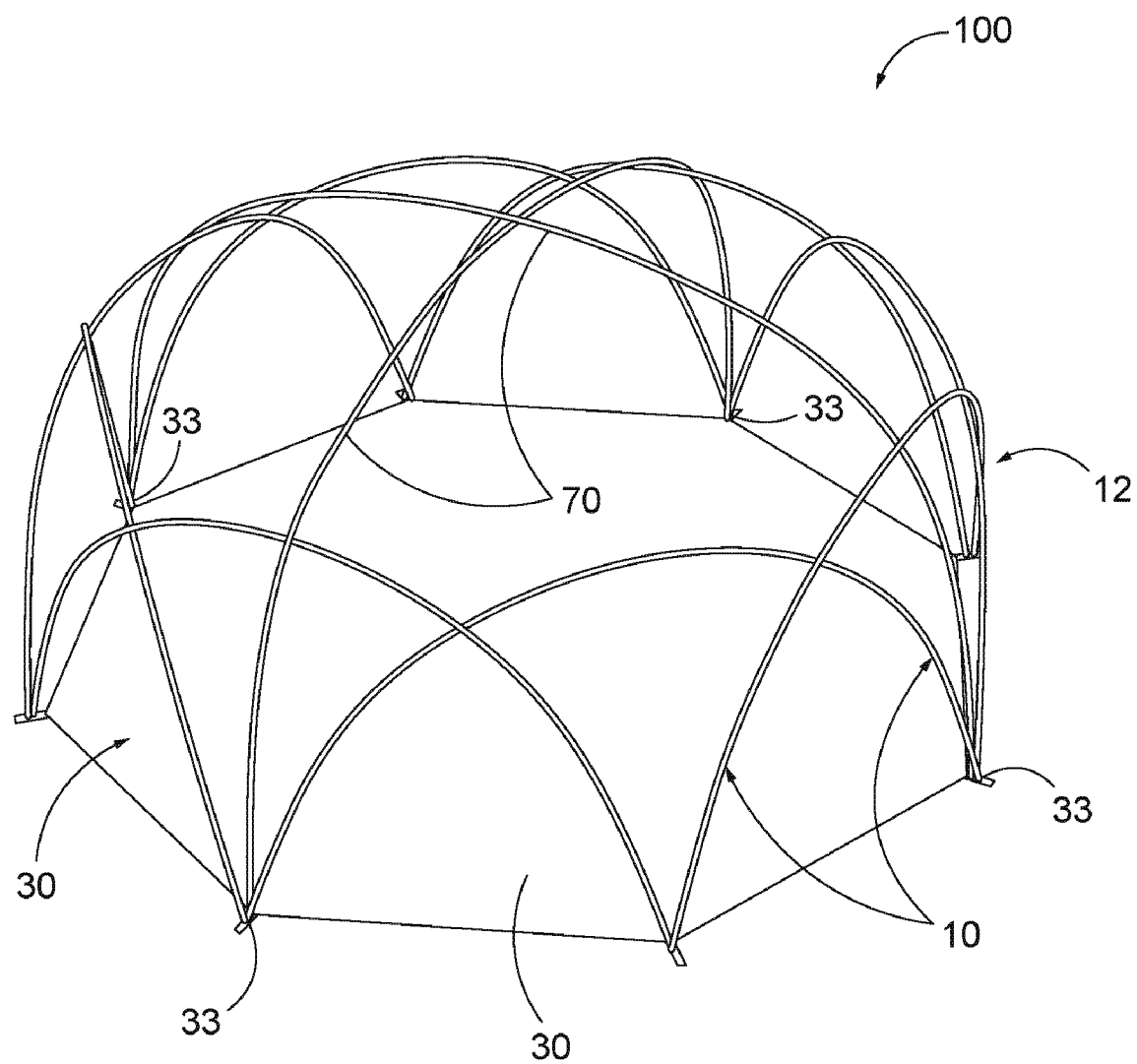

[Fig. 7b]
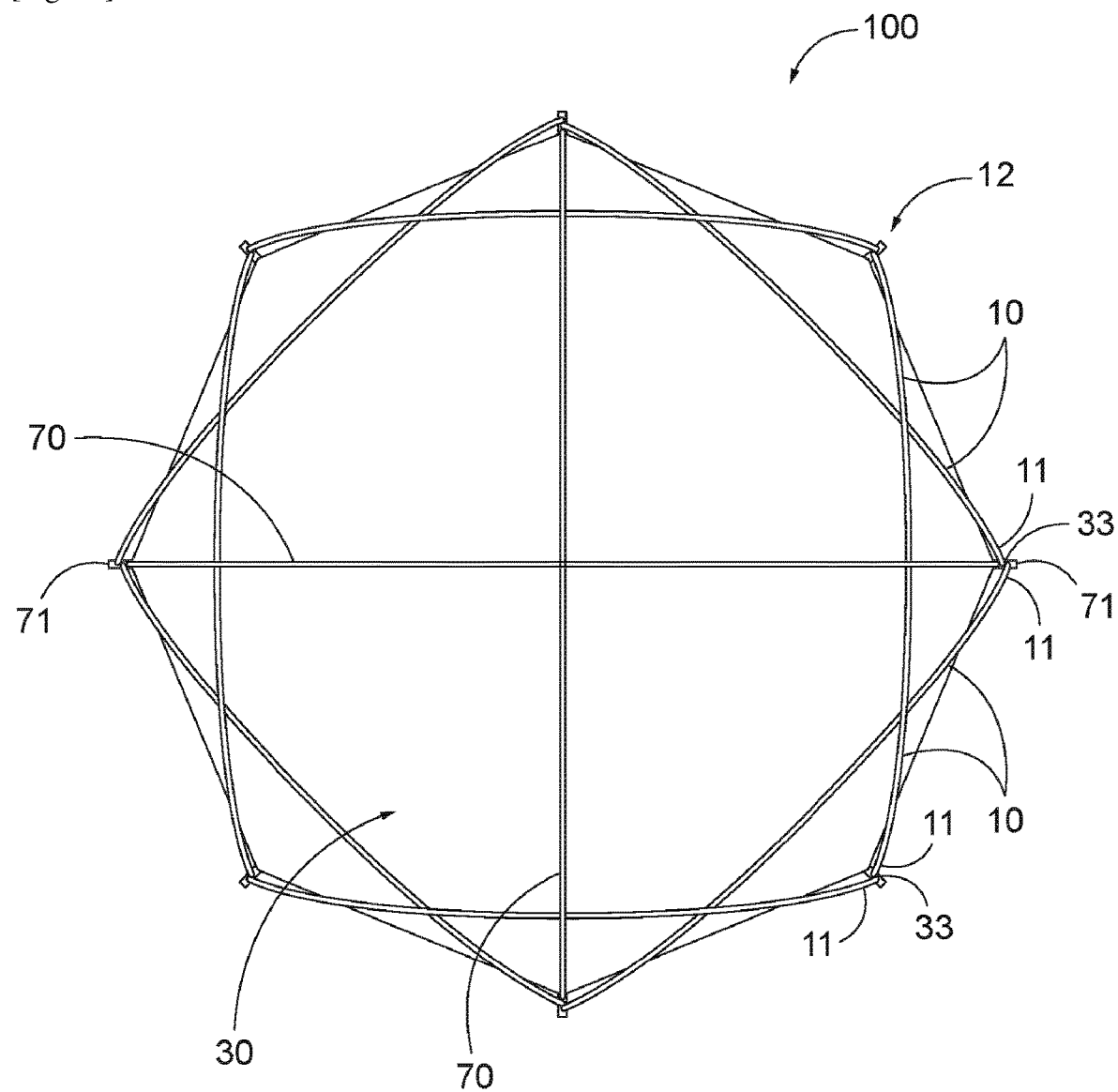

[Fig. 8a]
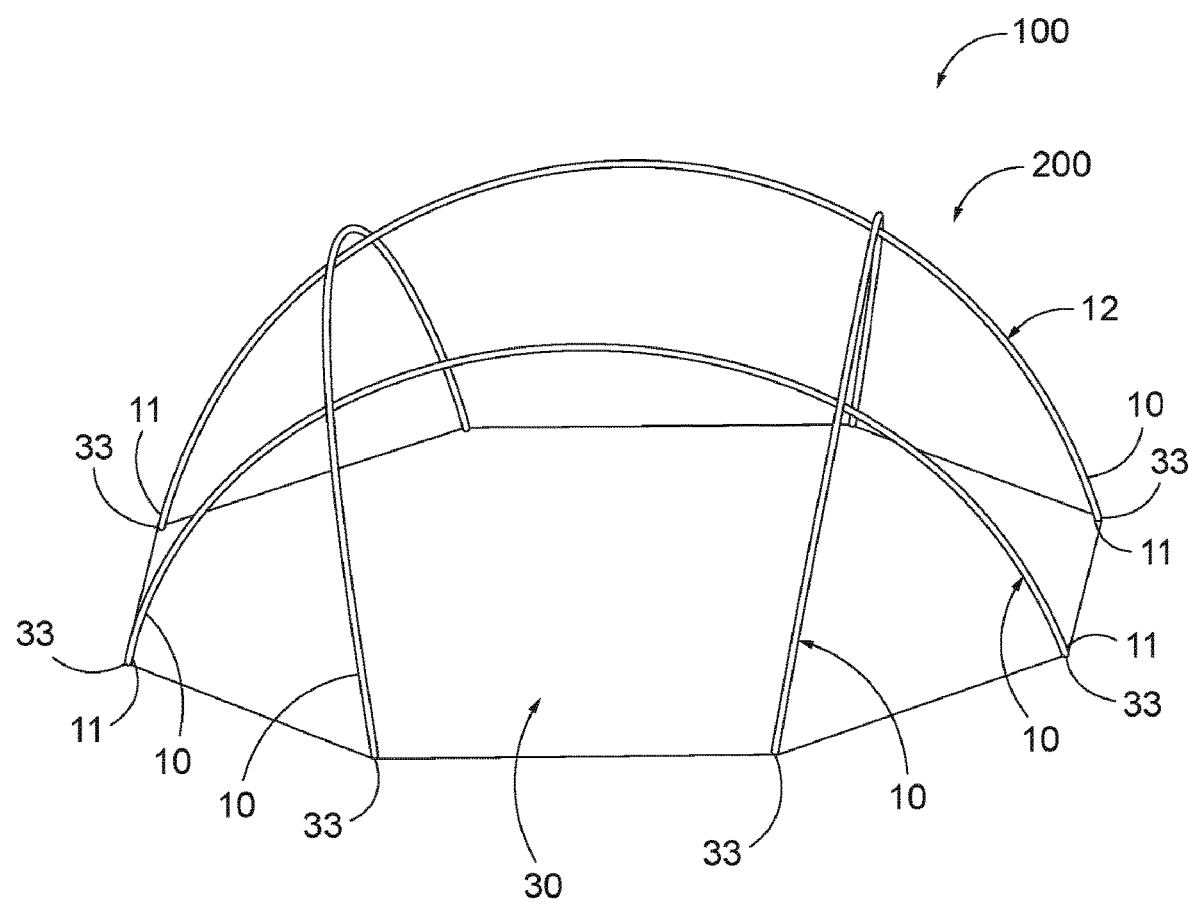

[Fig. 8b]
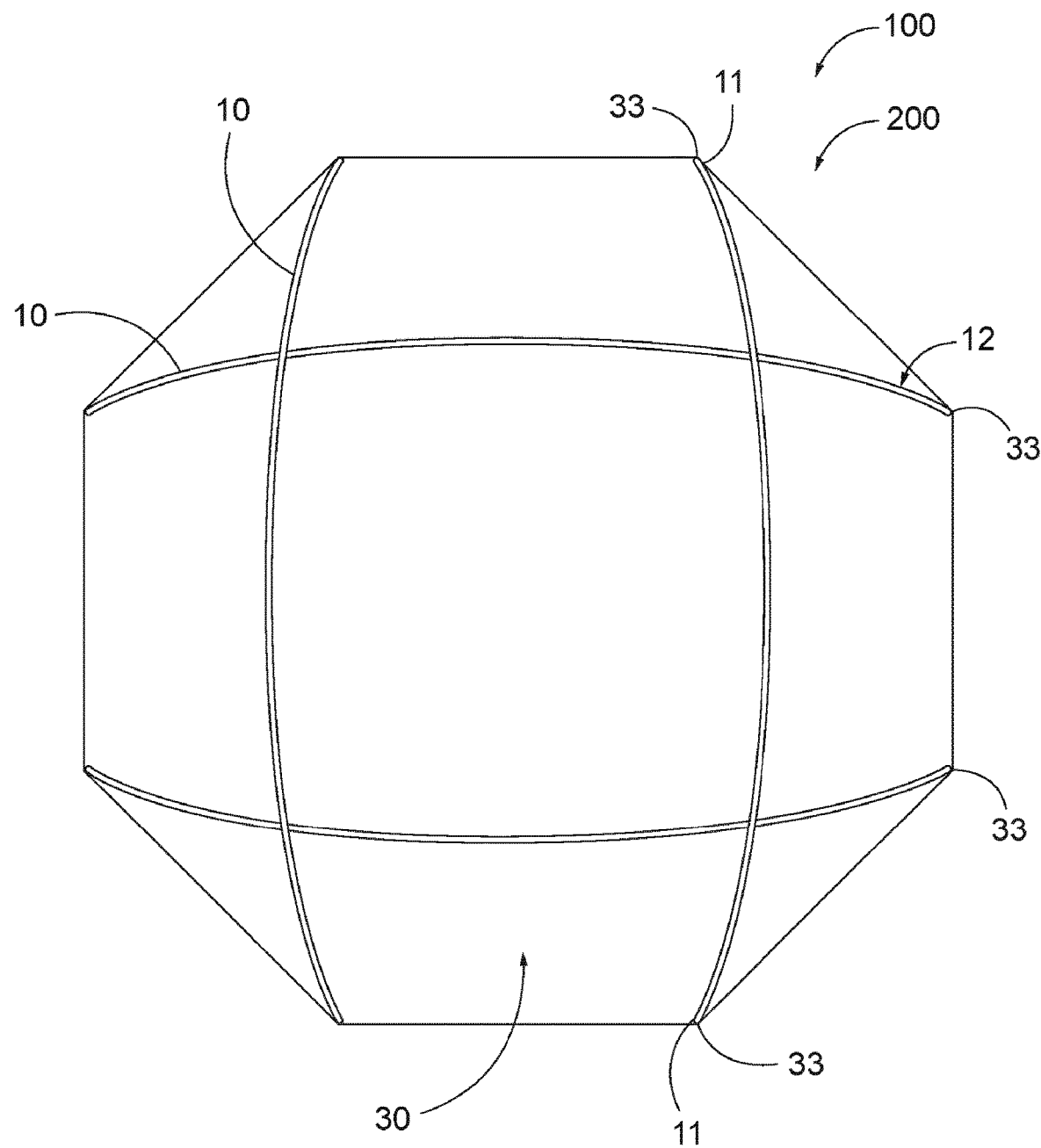

[Fig. 9a]
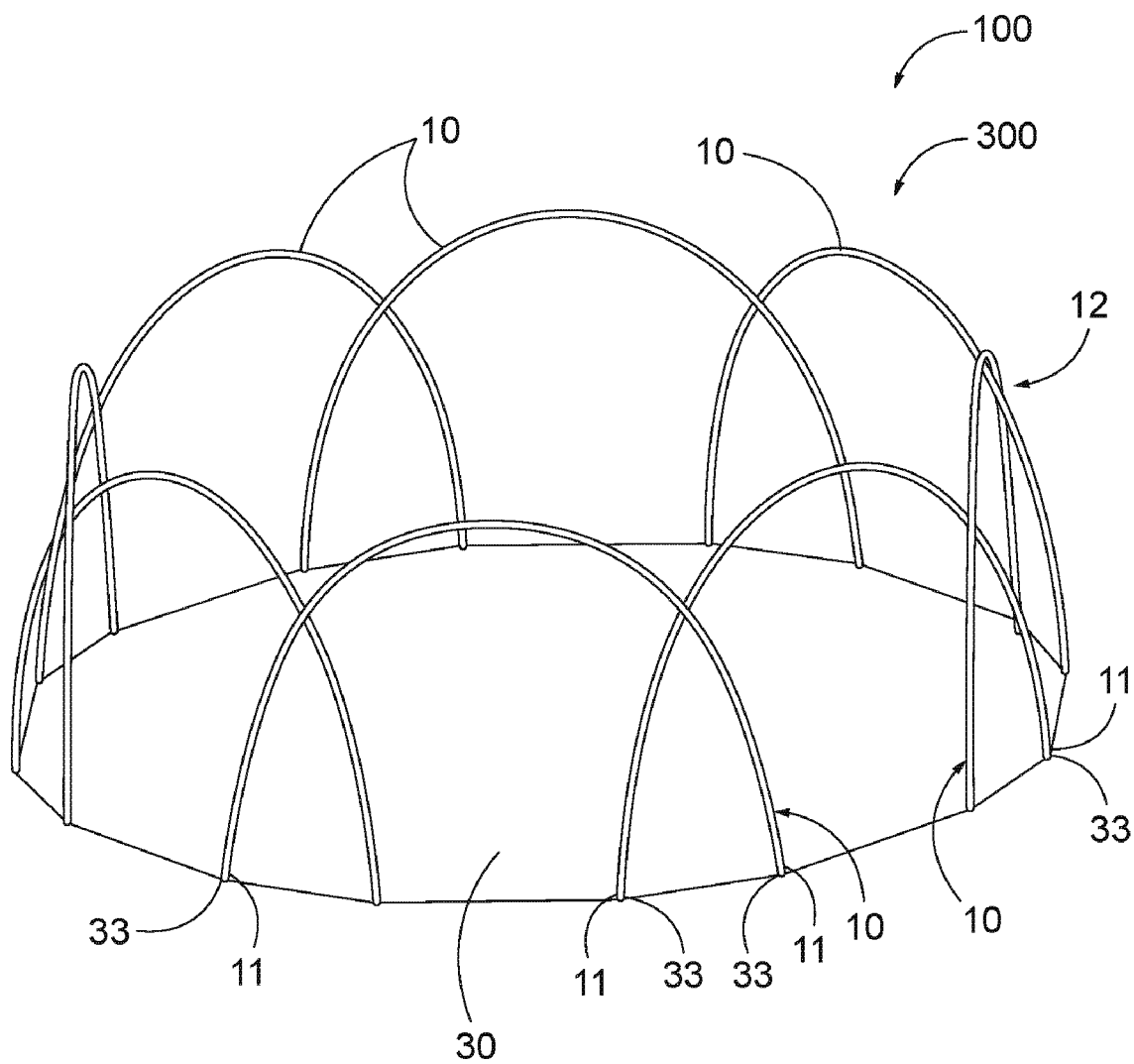

[Fig. 9b]
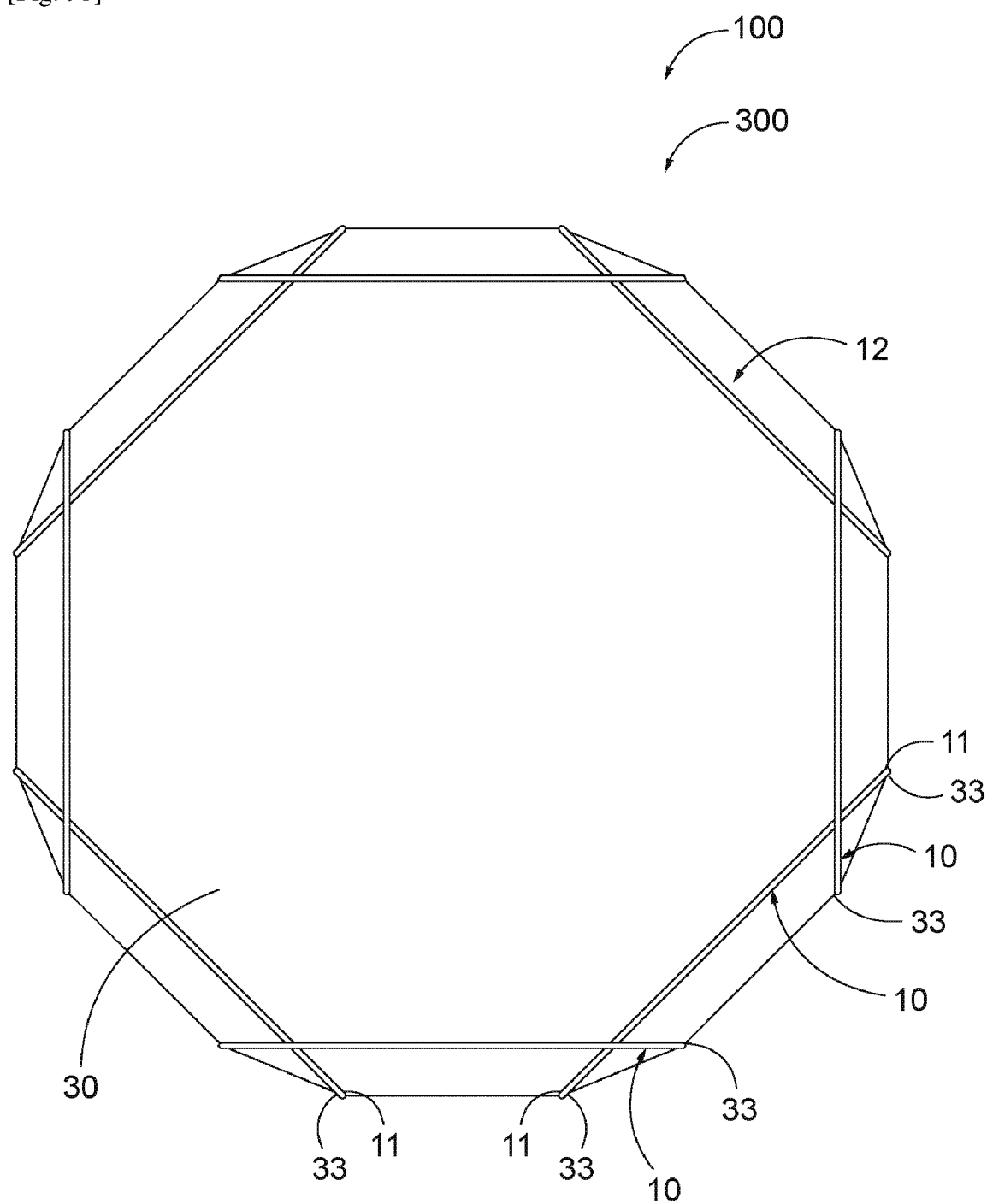

TENTS

TECHNICAL FIELD

The present disclosure relates to tents, and more particularly to tents that include arched support frames.

BACKGROUND ART

A tent may include a plurality of tent poles that form a frame and a tent fabric that is supported by the frame to form a temporary shelter space in camping or outdoors. For example, the tent fabric may be formed from synthetic fibers.

In particular, tents may form large-sized structures designed to accommodate a large number of people, such as festival tents or tents for temporarily accommodating refugees. Such tents often have an angular structure with a mountain-shaped roof.

Korean Patent Application Publication No. 10-1996-0014374 discloses an example of a conventional large-size tent. The conventional tent disclosed by the above Korean patent publication has a shape of a regular hexagon, which provides a more rigid structure than conventional tents having other shapes. In this design, main frames are fixed at the front and rear sides of the tent, and reinforcing frames may be fixed at the central area of the tent. Here, each of these main frames includes pillar parts corresponding to a riser part and ceiling support parts corresponding to a ceiling part. One end of each pillar part and two ends of the ceiling parts are connected by predetermined connectors.

Additionally, bar-type movement members are integrally fixed to each pillar part of the main frame at a predetermined height to adjust the height of the tent. One end of an auxiliary frame is fixed to each of two sides of the movement member, and the other end is fixed to the ground to form a predetermined shape, i.e., a triangular shape, spaced a predetermined distance apart from the pillar part of the main frame.

As described above and disclosed in the Korean patent publication, the auxiliary frames are fixed to all the pillar parts of all of the main frames with the movement members, and thus the entire framework of the tent is stably supported. Subsequently, the main frames, the reinforcing frames, and the auxiliary frames are connected to the tent fabric, thereby forming the assembled tent structure.

When this conventional tent structure forms a tent having a diameter of approximately 6 meters (m) or more, the tent may be sufficiently large and heavy that an installation specialist team may be needed to assemble the tent.

DISCLOSURE OF INVENTION

Technical Problem

The present disclosure is directed to tents, and specifically tents that include arched support frames that define at least a perimeter of the tent's assembled tent frame.

Solution to Problem

A tent according to the present disclosure includes a plurality of support frames, with each support frame being bent in a shape of an arch and having two ends configured to be supported on a ground surface when the tent is assembled. Each support frame crosses over at least one other support frame when the tent is assembled. Each support frame is positioned such that the ends of the support frame are positioned on non-adjacent vertices of a polygonal base surface when the tent is assembled. The non-adjacent vertices may have only one vertex between them, and some tents may have at least one vertex, two vertices, or more than two vertices between them. In some tents according to the present disclosure, the ends of a pair of the support frames are positioned at the same vertex of the polygonal base surface. In some tents according to the present disclosure, the support frames do not extend across, or over, a central region of the polygonal base surface. In some tents according to the present disclosure, the tent may further include a plurality of fixing members that connect overlapping support frames together, a central support that extends within a central region of the polygonal base surface to define the highest portion of the tent's frame, and/or one or more elastic cords that interconnect the arched regions of the support frames.

BRIEF DESCRIPTION OF DRAWINGS

FIG. 1 is a perspective view showing a tent of an example of the present disclosure.

FIG. 2 is a perspective view showing a support frame of a tent of an example of the present disclosure.

FIG. 3a is a schematic view illustrating an internal area of accommodation in a tent with a regular hexagon shaped polygonal base surface of an example of the present disclosure.

FIG. 3b is a schematic view illustrating an internal area of accommodation in a tent with a regular octagon shaped polygonal base surface of an example of the present disclosure.

FIG. 3c is a schematic view illustrating an internal area of accommodation in a tent with a regular decagon shaped polygonal base surface of an example of the present disclosure.

FIG. 3d is a schematic view illustrating an internal area of accommodation in a tent with a regular dodecagon shaped polygonal base surface of an example of the present disclosure.

FIG. 4a is a perspective view showing the coupling of adjacent support frames by a fixing member in a tent of an example of the present disclosure.

FIG. 4b is a perspective view showing the coupling of adjacent support frames by a fixing member in a tent of an example of the present disclosure.

FIG. 5 is a perspective view showing a tent of another example of the present disclosure.

FIG. 6 is a perspective view showing a support frame of a tent of another example of the present disclosure.

FIG. 7a is a perspective view showing an example of a tent in which a cross frame is installed.

FIG. 7b is a top plan view showing an example of a tent in which a cross frame is installed.

FIG. 8a is a perspective view showing a tent of another embodiment of the present disclosure in which two ends of a support frame are spaced apart and a polygonal base surface forms an octagon.

FIG. 8b is a top plan view showing a tent of another embodiment of the present disclosure in which two ends of a support frame are spaced apart and a polygonal base surface forms an octagon.

FIG. 9a is a perspective view showing a tent of still another embodiment of the present disclosure in which two ends of a support frame are spaced apart and a polygonal base surface forms a hexadecagon.

FIG. 9b is a top plan view showing a tent of still another embodiment of the present disclosure in which two ends of a support frame are spaced apart and a polygonal base surface forms a hexadecagon.

BEST MODE FOR CARRYING OUT THE INVENTION

Hereinafter, the examples of tents according to the present disclosure that are disclosed herein will be described in detail with reference to the accompanying drawings, in which identical or similar reference numerals are given to identical or similar elements, and an overlapping description is omitted herein. FIGS. 1-9b provide examples of tents 100 according to the present disclosure. Elements that serve a similar, or at least substantially similar, purpose are labeled with like numbers in each of FIGS. 1-9b, and these elements may not be discussed in detail herein with reference to each of FIGS. 1-9b. Similarly, all elements may not be labeled in each of FIGS. 1-9b, but reference numbers associated therewith may be utilized herein for consistency. Elements, components, and/or features that are discussed herein with reference to one or more of FIGS. 1-9b may be included in and/or utilized with any of FIGS. 1-9b without departing from the scope of the present disclosure.

It should be understood that the accompanying drawings are provided to facilitate the understanding of the embodiments disclosed herein, and the technical spirit disclosed herein is not limited by the accompanying drawings and covers all modifications, equivalents, or substituents included in the spirit and technical scope of the present disclosure. Similarly, so as not to detract from the core subject matter of the present disclosure, known and/or conventional tent features are not illustrated.

Terms including ordinal numbers such as "first", "second", and the like may be used to describe various elements, but such elements are not limited by these terms. The terms are only used to distinguish one element from another.

It will be understood that when an element is referred to as being "connected to" another element, it can be directly connected to the other element or intervening elements may be present. When intervening elements are present, the element may be referred to as being indirectly connected to the other element.

As used herein, the singular forms are intended to include the plural forms as well, unless the context clearly indicates otherwise.

It will be further understood that the terms "comprises" or "includes," when used in this specification, specify the presence of stated features, integers, steps, operations, elements, components, or groups thereof, but do not preclude the presence or addition of one or more other features, integers, steps, operations, elements, components, or groups thereof.

Referring to FIG. 1, an example of a tent 100 according to the present disclosure is shown and includes a plurality of support frames 10 that are interconnected, as described herein, to form an assembled tent frame 12. Assembled tent frame 12 supports a tent fabric 20 above a base surface 30. Base surface 30 is at least substantially, if not completely, circumscribed, or surrounded, by the assembled tent frame. Base surface 30 additionally or alternatively may be described as being a polygonal base surface 30, as the assembled frame 12 forms, or defines, a perimeter for the base surface 30, with the perimeter having a polygonal shape. In the following discussion, reference may be made interchangeably to the polygonal shape defined by the assembled tent frame and/or to the polygonal shape of the base surface. Thus, and as used herein, base surface 30 refers to the surface that is bounded or surrounded by the assembled frame 12.

In the present disclosure, the base surface 30 is a surface that is formed or otherwise positioned at the bottom of the tent 100. Stated differently, when the plurality of support frames 10 is installed on the ground surface to form assembled tent frame 12, base surface 30 may be defined by a shape formed by connecting the adjacent (i.e., proximal) regions where each of the two ends 11 of the plurality of support frames 10 touch the ground with imaginary lines. FIGS. 1 and 2 show an example of the polygonal base surface 30 formed at the bottom of the inside of the tent 100 in which the plurality of support frames 10 is installed. It thus is within the scope of the present disclosure that base surface 30 may be the region of ground surface 14 that is bounded by the assembled tent frame. However, it also is within the scope of the present disclosure that base surface 30 may be a physical surface or material that is placed upon the ground surface. For example, base surface 30 may be formed from the same material as tent fabric 20 or may be formed from a different material, such as canvas, a textile, synthetic fibers, and the like.

FIG. 2 provides another example of an assembled tent frame 12 for a tent 100 according to the present disclosure. The examples of tents 100 shown in FIGS. 1-2 demonstrate that tents 100 according to the present disclosure include an assembled tent frame 12 that defines, encloses, or bounds a polygonal base surface 30. In FIG. 1, the polygonal base surface is a regular dodecagon, and in FIG. 2, the polygonal base surface is a regular octagon. It is within the scope of the present disclosure that polygonal base surface 30 may have any geometric shape, such as one of a pentagon (i.e., a polygon with five sides) to a 24-sided polygon, with specific examples including pentagons, hexagons, heptagons, octagons, decagons, dodecagons, tetradecagons, hexadecagons, octadecagons, isocagons (20-sided pentagons), etc. As more specific examples, polygonal base surface 30 may be a polygon with at least five sides, at least six sides, at least eight sides, at least 10 sides, at least 12 sides, at least 15 sides, at least 20 sides, at most 24 sides, at most 18 sides, at most 12 sides, at most eight sides, and/or at most six sides.

Polygonal base surface 30 may be or define a regular polygonal shape, such as when support frames 10 have the same length. However, it also is within the scope of the present disclosure that polygonal base surface 30 may be or define an irregular and/or convex polygonal shape, in which each side of the polygon does not have the same length. For example, an irregular polygonal base surface may be formed when the support frames 10 do not all have the same length, such as if a subset of the plurality of support frames have lengths that are longer or shorter than the lengths of the rest of the plurality of support frames.

To form an assembled tent frame 12 that defines such a polygonal base surface 30, it follows that a tent 100 may include at least three support frames 10, at least 4 support frames 10, at least five support frames 10, at least six support frames 10, at least eight support frames 10, at least 10 support frames 10, at least 15 support frames 10, at least 20 support frames 10, at most 24 support frames 10, at most 18 support frames 10, at most 12 support frames 10, at most eight support frames 10, and/or at most six support frames 10.

FIG. 3a illustrates an example of a portion of the tent 100 that includes six support frames 10 and in which the polygonal base surface 30 is a six-sided regular polygon (i.e., a regular hexagon). FIG. 3b illustrates an example of a portion of the tent 100 that includes eight support frames 10 and in which the polygonal base surface 30 is an eight-sided regular polygon (i.e., a regular octagon). FIG. 3c illustrates an example of a portion of the tent 100 that includes 10 support frames 10 and in which the polygonal base surface 30 is a 10-sided regular polygon (i.e., a regular decagon). FIG. 3d illustrates an example of a portion of the tent 100 that includes 12 support frames 10 and in which the polygonal base surface 30 is a 12-sided regular polygon (i.e., a regular dodecagon). As an example, according to the present disclosure, it is possible to realize a tent 100 having the internal area of about 100 m² when the distance between two ends of the support frame, i.e., the length of one side, is 3000 mm, using a regular dodecagon shaped polygonal base surface.

Hereinafter, referring to FIGS. 3a to 3d, when the shape of the polygonal base surface 30 is a regular hexagon (i.e., a regular polygon with six sides), a regular octagon (i.e., a regular polygon with eight sides), a regular decagon (i.e., a regular polygon with 10 sides), and a regular dodecagon (i.e., a regular polygon with 12 sides), the internal area that can be accommodated by the tent 100 of the present disclosure is described. Here, the outer periphery of a regular polygon may be approximated as the circumference, and the entrance (the length of one side) of 2100 mm or 2500 mm is given for calculation.

As shown in FIG. 3a, in case that the polygonal base surface 30 is a regular hexagon, the length of one side is regarded as the entrance width, and when the entrance width is 2500 mm, 2500 mm×6=15000 mm, which is calculated as the circumference, divided by 3.14, obtaining a space of a circle having a diameter of 4777 mm.

Additionally, as shown in FIG. 3b, in case that the polygonal base surface 30 is a regular octagon, the length of one side is regarded as the entrance width, and when the entrance width is 2500 mm, 2500 mm×8=20000 mm, which is calculated as the circumference, divided by 3.14, obtaining a space of a circle having a diameter of 6370 mm.

Additionally, as shown in FIG. 3c, in case that the polygonal base surface 30 is a regular decagon, the length of one side is regarded as the entrance width, and when the entrance width is 2100 mm, 2100 mm×10=21000 mm, which is calculated as the circumference, divided by 3.14, obtaining a space of a circle having a diameter of 6688 mm.

Meanwhile, as shown in FIG. 3d, in case that the polygonal base surface 30 is a regular dodecagon, the length of one side is regarded as the entrance width and when the entrance width is 2100 mm, 2100 mm×12=25200 mm, which is calculated as the circumference, divided by 3.14, obtaining a space of a circle having a diameter of 8025 mm. In case that the polygonal base surface 30 is a regular dodecagon, when the entrance width is 3000 mm, a space of a circle having a diameter of 11464 mm is obtained, and its internal area is about 100 m².

When polygonal base surface 30 has the shape of a regular polygon, the area of the polygonal base surface may be calculated using the formula Area=ap/2, where "a" is the apothem (a line from the center of the polygonal base surface to the center of a side of the polygonal base surface) and where "p" is the perimeter of the polygonal base surface.

The polygonal base surface 30 of tent 100 may have any appropriate dimensions, such as a linear dimension and/or an area. For example, when the polygonal base surface 30 is a regular polygon, a distance between adjacent vertices of the regular polygon may be regarded as an entrance width of the tent 100. As more specific examples, the entrance width of the tent 100 may be at least 500 millimeters (mm), at least 1000 mm, at least 1300 mm, at least 1500 mm, at least 2000 mm, at least 2300 mm, at least 2500 mm, at least 3000 mm, at least 3300 mm, at least 3500 mm, at most 4000 mm, at most 3200 mm, at most 2700 mm, at most 2200 mm, at most 1700 mm, at most 1200 mm, and/or at most 700 mm. As another example, when the polygonal base surface 30 is a regular polygon, an area of the regular polygon may be regarded as an internal area of the tent 100. As more specific examples, the internal area of the tent 100 may be at least 10 square meters (m²), at least 30 m², at least 50 m², at least 100 m², at least 130 m², at least 150 m², at most 200 m², at most 120 m², at most 70 m², and/or at most 20 m².

Support frames 10 additionally or alternatively may be referred to a support poles 10, tent poles 10, and/or frame members 10. The support frames may be formed from any suitable material, such as aluminum or another metal or alloy, fiberglass, carbon fiber, a polymer, or a plastic. Each support frame 10 may be formed as a one-piece structure, or each support frame may be formed from a series of frame segments 15 (indicated schematically in dashed lines in FIG. 2) that are interconnected in an end-to-end relationship. When a series of frame segments are used, the segments may be partially telescoping and may be interconnected by a flexible cord, such as an elastic cord, that urges the frame segments to remain interconnected once assembled in an end-to-end relationship.

As illustrated in FIGS. 1-2, each support frame 10 of the plurality of support frames 10 includes two ends, or end regions, 11 (labelled in in FIG. 2) that are configured to be fixed or otherwise supported on a ground surface 14. As examples, each end 11 may be supported on ground surface 14, may be inserted into ground surface 14, may extend against ground surface 14, may extend against a base surface 30 that is positioned on the ground surface, and/or may be inserted into sockets, or receivers, 31 (schematically illustrated in dashed lines in FIG. 2) that are positioned on the ground surface and/or which are coupled to or form a portion of the base surface. Examples of receivers 31 include apertures in a base surface 30, hooks, clips, and sockets that are sized to snugly receive the end of one or a pair of support frames. The ends 11 of the plurality of support frames may be positioned at the vertices 33 of the polygonal shape formed by the assembled tent frame 12.

When tent 100 is assembled, each support frame 10 of the plurality of tent frames 10 that form assembled tent frame 12 is bent into an arch shape. As more specific examples, when tent 100 is assembled, each support frame 10 may be bent into a shape that is semicircular, elliptical, parabolic, and/or hyperbolic. Furthermore, each of the support frames 10 of the assembled tent frame 12 crosses over and/or intersects at least one other of the support frames of the assembled tent frame. As examples, each support frame may cross over one other support frame, two other support frames, or more than two other support frames of the assembled tent frame. It is within the scope of the present disclosure that support frames 10 may be described as crossing over or intersecting each other when a planar projection through the entirety of one support frame also extends through the one or more other support frames. As another example, support frames 10 may be described as intersecting each other when they are directly or indirectly connected together, such as by a subsequently described fixing member 60.

As discussed, when tent 100 is assembled, the ends 11 of the plurality of support frames 10 are supported on the ground surface 14 at points that form the vertices 33 of the polygonal base surface 30. As shown in more detail in FIGS.

1 and 2, when tent 100 is assembled, each support frame 10 is positioned such that the ends 11 of the support frame 10 are positioned on non-adjacent vertices of the polygonal base surface 30. As shown, each of the two ends 11 of the support frame 10 is supported on ground surface 14 and/or base surface 30, and each end 11 intersects with one end 11 of another support frame 10 to form a bottom intersection at a vertex 33 of the polygonal base surface 30. The one or more vertices between the vertices to which the ends 11 of a support frame 10 are positioned may be referred to herein as skipped vertices or intermediate vertices.

Stated differently, when tent 100 is assembled, each support frame 10 is positioned such that the ends 11 of the support frame 10 are arranged on the vertices 33 of the polygonal base surface 30, with at least one vertex being skipped between the two ends 11 of the support frame 10. For example, the ends 11 of a support frame 10 may be positioned so that there is only one vertex, at least one vertex, two vertices, at least two vertices, more than two vertices, three vertices, or more than three vertices of the polygon (and/or base surface 30) between the ends. As another example, the polygonal base surface 30 may be an n-sided polygon (where "n" is an integer), and n or fewer support frames 10 may be positioned on the polygonal base surface 30 such that the ends 11 of each support frame 10 are positioned on respective vertices 33 of the n-sided polygon (and/or base surface 30), as described herein.

It is within the scope of the present disclosure that the ends 11 of two support frames 30 may be positioned at each vertex 33 of the polygonal shape and/or base surface 30. FIGS. 1 and 2 provide graphical examples of tents 100 having this configuration. This is not required to all tents 100 according to the present disclosure. For example, the two ends 11 of different support frames 10 may be placed at different vertices 33 of the polygonal shape and/or base surface 30. In such an embodiment, a given pair of support frames 10 may be positioned on the polygonal base surface 30 such that no two of the ends 11 of the pair of support frames 10 are positioned on a common (i.e., the same) vertex of the polygonal base surface 30.

As a further option, it is within the scope of the present disclosure that the ends 11 of a support frame 10 are not spaced apart by more than 40%, and optionally not more than 33% and/or not more than 25%, of the vertices of the polygonal shape and/or base surface 30. As an example, if the assembled frame 12 defines a dodecagon (12-sided) shape, the ends 11 of a support frame may be separated by at most 4 vertices, and optionally, at most 3 vertices, at most 2 vertices, and/or 1 vertex. In such a configuration, the support frames 10 of the assembled tent frame 12 do not extend across the center, or center region, of the polygonal shape defined by the assembled tent frame and thus do not extend across the center, or center region, of the base surface 30. As used herein, the "center region" of base surface 30, assembled tent frame 12, and/or tent 100 is the center-most 75%, center-most 60%, center-most 40%, center-most 35%, center-most 30%, center-most 25%, center-most 20%, center-most 15%, and/or center-most 10% of the base surface, assembled tent frame, and/or tent 100. These "center-most" percentages are intended to be calculated based on a top plane projection (i.e., looking down from above) of the corresponding base surface, assembled tent frame, and/or tent. This configuration contrasts with many conventional tents, in which the support frames cross over each other at or proximate the center of the tent's base surface.

As illustrated in FIG. 2, each support frame 10 of assembled tent frame 12 may have a curved part 13, and the curved part 13 may have a shape of an arch such that the central part between the two ends 11 of the support frame 10 bulges upwards and thus away from base surface 30, relative to ends 11. The support frame 10 may have a shape of a hoop, with the curved part 13 extending upwardly from ground surface 14. The curvature of the curved part 13 of support frame 10 may be configured, selected, and/or optimized to correspond to the overall size of the tent 100 or a desired rigidity of the tent 100.

As used herein, positional terms such as "upwards," "downwards," "above," "below," "top," "bottom," and the like are considered from the perspective of tent 100 assembled upright upon a ground surface such that polygonal base surface 30 is or extends along the ground surface. As an example, each curved part 13 may be described as being above each end 11 of the support frame 10 when tent 100 is assembled. As another example, when tent 100 is assembled, each end 11 of the support frame 10 may be described as extending toward the ground surface, and curved part 13 may be described as extending away from the ground surface.

FIG. 2 shows an example in which the plurality of support frames 10 bulges upwards and in which the two ends 11 of each of adjacent support frames 10 of the plurality of support frames 10 are placed in an alternating manner. Stated differently, in the example of FIG. 2, the two ends 11 of each support frame 10 are positioned on the vertices 33 of the polygonal base surface 30 such that one vertex 33 of the polygonal base surface 30 is positioned between the two ends 11 of the support frame 10. For example, the two ends 11a, 11b of support frame 10a may be respectively installed at the two non-adjacent vertices 33a, 33b of the polygonal base surface 30, with vertex 33c thus being between the vertices to which the ends 11a, 11b of the support frame are installed. Vertex 33c thus may be described as being skipped by the ends of support frame 10a. As also shown in FIG. 2, vertex 33c receives an end 11c of support frame 10b, which crosses over support frame 10a and another of the assembled tent frame's support frames and includes a second end 11d that is installed at a further vertex 33d of the polygonal base frame. Vertex 33d is non-adjacent to vertex 33c, with vertex 33b being a skipped vertex (based on ends 11a and 11b of support frame 10b) between vertices 33c and 33d.

With continued reference to FIGS. 1-2, tents 100 according to the present disclosure further may include a plurality of fixing members 60. Fixing member 60 additionally or alternatively may be referred to as a frame fixing member 60, a fixing ring 60, a frame fixing ring 60, a frame clip 60, and/or a frame fixing clip 60. Each frame fixing member 60 is configured to bind or otherwise secure two overlapping support frames 10 to one another at an intersection, or cross over region, of the two overlapping support frames 10. Frame fixing member 60 may have any suitable construction and/or component(s) to be removably coupled to the intersections of the two overlapping support frames 10. Examples of suitable constructions for frame fixing members 60 include lengths of hook-and-loop (VELCRO®) material, straps, cable ties, clips, resilient rings, and the like. Frame fixing member 60 may be designed for a one-time use, meaning that the frame fixing member is damaged or destroyed during removal of the frame fixing member from the pair of support frames that were bound together by the frame fixing member. However, it is within the scope of the present disclosure that the frame fixing members may be designed to be selectively installed to bind two support frames together and thereafter removed from the pair of support frames and reused to bind the same or different support frames together, all without damaging or destroying the frame fixing member. In other words, the frame fixing members may be designed to be single-use frame fixing members or to be reusable frame fixing members. Reusable frame fixing members additionally or alternatively may be described as being configured to be repeatedly used, as being repeatedly coupled to and removed from the support frames, and/or as being repeatedly coupled to and removed from the support frames without damage or destruction of the frame fixing members or the support frames.

FIGS. 4a and 4b illustrate an additional example of a suitable construction for a frame fixing member 60. As shown, frame fixing member 60 includes a first member 61 and a second member 63 that is coupled for movement relative to first member 61. First member 61 may have, or include, a first receiving part 62a and a second receiving part 62b. First receiving part 62a is configured to receive a first support frame 10c of a pair of support frames 10 that cross over each other, and second receiving part 62b is configured to receive a second support frame 10d of the pair of support frames 10 that cross over each other. Thus, first fixing member 61 may be described as receiving the portions of the pair of support frames 10 that cross over each other.

The first member 61 is configured to selectively retain the portion of the support frame that extends through the first receiving part 62a, such as to prevent or resist unintentional sliding of the support frame relative to the fixing member and/or unintentional removal of the support frame from the fixing member. FIGS. 4a and 4b provide an example of a suitable mechanism for selectively retaining a support frame 10 (such as first support frame 10c) within first receiving part 62a. As shown, first member 61 may include a pressing hole 62c that is in communication with the first receiving part 62a, frame fixing member 60 may further include a pressing member 62d that is installed in the pressing hole 62c to press-fix the first support frame 10c in a selected position within first receiving part 62a. The pressing member 62d may be coupled to the pressing hole 62c in any appropriate manner, such as by a screw method or interference friction-fitting method. For example, in the case of coupling by a screw method, threads may be formed on the outer circumference of the pressing member 62d and the inner circumference of the pressing hole 62c to enable screw coupling, namely, selected threaded rotation of the pressing member within the pressing hole to selectively move an end of the pressing member into and out of engagement with the portion of the first support frame that is received within the first receiving part. Another example of a mechanism for selectively retaining a support frame within first receiving part 62a includes first receiving part 62a being sized and/or shaped to create a friction fit, or snap fit with the received portion of the support frame.

The second member 63 is configured to selectively move relative to first member 61 to selectively retain or release the portion of the support frame (such as second support frame 10d) that is received in the second receiving part 62b. In the example of FIGS. 4a and 4b, the second member is pivotally coupled to first member 61, although other selective interconnections and relative movements may be utilized. In the illustrated example, second member 63 may be selectively pivoted relative to first member 61 to press-fix the second support frame 10d of the support frames 10 that cross over each other in the second receiving part 62b, thereby preventing or restricting relative movement of the second support frame relative to fixing member 60 and to the other support frame (such as first support frame 10c) that is received into first receiving part 62a.

Expressed in slightly different terms, fixing member 60 may be described as including a first member 61 with a first receiving part 62a in which a first support frame 10c of the plurality of support frames 10 is received to fixedly couple the first support frame within the first receiving part. The fixing member 60 may further be described as including a second receiving part 62b, in which a second support frame 10d of the plurality of support frames 10 is received, and a second member 63 that is pivotally coupled to the first member to fixedly couple the second support frame within the second receiving part. Furthermore, the fixing member may be described as further including a third member 65 that is configured to position the second support frame relative to the second receiving part, and the second member may include a receiving groove 63c in which the third member is received when the second member fixedly couples the second support frame within the second receiving part.

Referring to FIG. 4a, the second member 63 may have at least one coupling protrusion 63a, such as at one end of the second member 63, to allow the second member 63 to be coupled to the first member 61 in a position that provides the above-discussed retention of the second support frame. Similarly, first member 61 may include a coupling groove 63b into which each coupling protrusion 63a is inserted such that the second member 63 presses and/or retains the second support frame 10d. When each coupling protrusion 63a is inserted into a corresponding coupling groove 63b of the first member 61, the first and second members may cooperate to press-couple the second support frame 10d relative to the fixing member.

As described above, referring to FIGS. 4a and 4b, the first support frame 10c is fixedly press-coupled by the first member 61, and the second support frame 10d is fixedly press-coupled by the second member 63 such that the support frame 10d may be described as intersecting with the first support frame 10c that is received in the first member 61. Additionally or alternatively, the support frames 10c and 10d may be described as crossing over each other and/or being coupled together at, or by, fixing member 60, thereby stably maintaining the adjacent support frames 10 in an intersecting arrangement.

As further illustrated in FIG. 4a, the fixing member 60 may further include a third member 65. Third member 65, when present, is a partial (i.e., C-shaped) or complete ring through which the second support frame extends. When present, the third member 65 is received within a receiving groove or notch 66 in the first member 61 to temporarily retain the second support frame 10d of the support frames 10 that cross over each other relative to the first member. When the second support frame 10d is fixed by the third member 65 and the second member 63, the third member 65 may be positioned inside of the second member 63, such as shown in FIG. 4a. For example, and as illustrated in FIG. 4a, the second member 63 may have a receiving groove or notch 63c in which the third member 65 is received when the second member 63 press-fixes the second support frame 10d.

In case that the fixing member 60 further includes the third member 65, when the third member 65 temporarily fixes the second support frame 10d, the second member 63 may receive the third member 65 while pressing the second support frame 10d against first member 61. This may strengthen the coupling, or retaining force, applied to the second support frame.

As illustrated in FIG. 1, tents 100 according to the present disclosure include not only a plurality of support frames 10 that may be selectively assembled to form assembled tent frame 12, but also a tent fabric 20. The tent fabric 20 may be installed in a space between and/or bounded by the plurality of support frames 10. Stated differently, the tent fabric 20 may at least substantially cover the space between the plurality of support frames 10. Tent fabric 20 may be described as covering the exterior of the assembled tent frame, and optionally as extending over the entirety of the base surface 30 that is bounded by the assembled tent frame, as discussed in more detail herein. Tent fabric 20 may be supported on, or by, the assembled tent frame, and tent fabric 20 may be releasably fixed to the assembled tent frame.

Tent frame 20 may be formed from separate lengths of material that are individually coupled to one or more support frames 10 of the assembled tent frame, or the tent fabric may include a length of material that is coupled to all of the support frames in the assembled tent frame.

Additionally or alternatively, the tent fabric 20 may be installed on the plurality of support frames 10 to form an upper part of the tent 100. As used herein, the upper part of the tent 100 also may be referred to as the roof 40 of the tent 100. In this case, the tent fabric 20 may be supported by a center pole 50 as described below and such as shown in FIG. 5. However, as demonstrated by the example of a tent 100 shown in FIG. 1, tents 100 according to the present disclosure also may include the tent fabric 20 that does not form a roof of the tent 100 and/or that does not extend over the center region of the base surface of the tent. Such a tent 100 may be described as including tent fabric 20 that only covers the sides of the assembled tent frame, such as to protect against wind on the sides and/or to define a solid or continuous barrier around the assembled tent frame.

Tent fabric 20 may be coupled to the assembled tent frame 10 and/or supported upon the assembled tent frame. For example, and as illustrated in the detail portion of FIG. 1, a tent 100 may include a plurality of connecting rings 25 that selectively connect tent fabric 20 to the support frames 10 of the assembled tent frame 12. Connecting rings 25, when present, may be installed at the edges of the tent fabric 20, and the tent fabric 20 may be installed on the plurality of support frames 10 by the plurality of connecting rings 25. Connecting rings 25, when present, may be separate structures that are removably connected to the fabric and the support frames. Alternatively, the connecting rings may be a portion of and/or permanently connected to one of the tent fabric or the support frames.

Connecting rings may, but are not required to, have a circular shape and may, but are not required to, extend completely around a support frame at the region where the support frame is fixed to the tent fabric. As such, connecting rings 25 additionally or alternatively may be referred to as connectors 25 or couplers 25 that are configured to releasably connect regions of the tent fabric to regions of the support frames that form the assembled tent frame. Connecting rings 25 may be formed of any suitable material or combination of materials, including the examples of materials from which the tent fabric and/or support frames may be formed.

When tent 100 includes a fixing member 60 and the fixing member also secures a region of the tent fabric to the interconnected regions of the support frames that are received into the fixing member, the fixing member also may be described as being or including a connector 25 or even a connecting ring 25. In such an embodiment, the tent fabric 20 may be operatively connected to the plurality of support frames 10 by the plurality of connecting rings 25 positioned such that the plurality of connecting rings 25 are distributed along a length of each support frame 10. Also in such an embodiment, a subset of the plurality of connecting rings 25 additionally or alternatively may operatively couple two intersecting support frames 10 to one another, such that the subset of the plurality of connecting rings 25 may operate as and/or be referred to as fixing members 60.

Hereinafter, referring to FIGS. 5 and 6, a reinforcing cord 16 (illustrated in FIG. 6) and a center pole 50 are described. Note that there is no structural difference between the tent 100 of FIGS. 5 and 6 and the tent 100 of FIGS. 1 and 2 except that FIGS. 5 and 6 illustrate a configuration in which the reinforcing cord 16 and the center pole 50 are further installed at the tent 100 and in which the upper part of the tent is formed, or supported, by the center pole 50, which supports a roof 40 of the tent. To simplify the description and drawings of the tents of FIGS. 5-6 (and 7-9b), not all of the previously described features, components, and/or variants that are described and/or illustrated in FIGS. 1-4b are described and/or illustrated again with respect to FIGS. 5-9b. It is within the scope of the present disclosure, however, that the tents of FIGS. 5-9b may include any of the features, components, and/or variants described in connection with the tents of FIGS. 1-4b and that the tents of FIGS. 1-4b may include any of the features, components, and/or variants that are described and/or illustrated in connection with FIGS. 5-9b.

As shown in FIG. 6, a tent 100 according to the present disclosure may further include one or more reinforcing cords 16 that are configured to connect at least two support frames 10 of the plurality of support frames 10 forming the assembled tent frame 12, such as to increase the rigidity of assembled tent frame 12. Reinforcing cord 60 may resist movement of the connected support frames away from each other and/or away from a center region of the polygonal base surface. Reinforcing cord may be formed from any suitable material, including wire, cable, rope, plastic, metal, a resilient material, and/or an elastomeric material. When reinforcing cord 60 is formed from an elastomeric material, the reinforcing cord may be described as biasing, or urging, the connected portions of the support frames toward each other and/or toward a center region of the polygonal base surface.

When present, the one or more reinforcing cords 16 may interconnect any suitable regions of the support frames, including predefined regions or regions that are selected by a user when the tent frame is assembled. As an example, the one or more reinforcing cords may interconnect the arched regions of the support frame, regions of the support frames that are interconnected by a fixing member 60, etc. FIG. 6 shows an example in which the two reinforcing cords 16 are installed in the shape of squares over the fixing members 60 such that each reinforcing cord 16 is installed over a plurality of non-adjacent fixing members 60.

A tent 100 according to the present disclosure may further include the center pole 50 that is installed on the polygonal base surface 30 and/or extends upwards from the polygonal base surface 30 in the center region of the tent. Center pole 50 typically will be used with tents having a tent fabric 20 that forms a roof 40 of the tent, with the center pole supporting the tent frame to define or form the highest portion of the tent. In other words, when the tent 100 further includes the center pole 50, the tent fabric 20 may be installed such that it is supported by the plurality of support frames 10 and the center pole 50. In such an embodiment, the portion of the tent fabric 20 that is supported by the center pole 50 may form an upper surface of the tent that is higher than the other portions of the tent fabric that are supported by support frames 10. An example of such a tent is shown in FIG. 5. When center pole 50 is utilized, it may be installed within the tent at any suitable time, such as after the tent fabric is supported on the assembled tent frame formed by the plurality of support frames 10. For example, an end of center pole 50 may be inserted beneath the tent fabric that extends over the polygonal base surface and then the tent pole may be raised to a vertical orientation, thereby lifting up the tent fabric 20 that extends over the polygonal base surface.

FIG. 6 shows an example in which center pole 50 is installed and includes a pole end 51 that extends higher than the plurality of support frames 10 at the center of the polygonal base surface 30. Stated differently, in the example of FIG. 6, pole end 51 of center pole 50 extends higher than the top of each support frame 10 and each fixing member 60.

FIGS. 7*a* and 7*b* graphically illustrate that a tent 100 according to the present disclosure optionally may include at least one cross frame 70, which also may be referred to as an arched cross frame 70. Cross frame 70 may provide additional support to the assembled tent frame 12 and/or may support tent fabric 20 that forms a roof 40 of the tent. Unlike the previously described support frames 10 that form assembled tent frame 12 and which do not extend across, or over, a center region of polygonal base surface 30, assembled tent frame 12, and/or tent 100, cross frame 70 extends across, or over, the center region of polygonal base surface 30, assembled tent frame 12, and/or tent 100. It is further within the scope of the present disclosure that the one or more cross frames 70 may extend over, or across the geometric center of the polygonal base surface 30, assembled tent frame 12, and/or tent 100. When a tent 100 includes two or more cross frames 70, the two or more cross frames may cross over, or intersect, over the center, or center region, of the polygonal base surface 30, assembled tent frame 12, and/or tent 100. Additionally or alternatively, the two or more cross frames may cross over, or intersect, at the highest portion of the tent.

FIGS. 7*a* and 7*b* illustrate an example of a tent 100 that includes two cross frames 70. It is within the scope of the present disclosure that a tent 100 that includes a cross frame 70 may include one cross frame 70, two cross frames 70, three cross frames 70, four cross frames 70, or more than four cross frames 70. Cross frames 70, when present, may overlap at the upper part of the tent, and two ends 71 of each cross frame 70 may be supported on the ground surface upon which the tent is supported and/or on polygonal base surface 30. It is further within the scope of the present disclosure that each end of the cross frame may be supported or otherwise positioned at a vertex of the polygonal base surface 30, and optionally at a vertex of the polygonal base surface at which one or a pair of ends of support frames 10 are positioned. FIGS. 7*a* and 7*b* show an example in which two cross frames 70 overlap and are installed on the ground with two ends of each cross frame 70 placed at respective vertices 33 of the polygonal base surface 30. In such an embodiment, and as illustrated in FIG. 7*b*, the two cross frames 70 may intersect at an angle of about 90 degrees, and thereby, the cross frames 70 may be placed as widely as possible on the polygonal base surface, forming the upper part of the tent. As additional examples, in an embodiment of the tent 100 that includes at least two cross frames 70, the cross frames 70 may intersect at an angle that is at least 20 degrees, at least 40 degrees, at least 60 degrees, at least 80 degrees, at most 90 degrees, at most 70 degrees, at most 50 degrees, and/or at most 30 degrees.

FIGS. 8*a* to 9*b* illustrate tents 200 and 300, which are embodiments of tents 100 according to the present disclosure. Tents 200 and 300 are provided to illustrate graphically that tents 100 accordingly to the present disclosure are not limited to the specific embodiments shown in FIGS. 1-7*b*. Tents 200 and 300 thus may be described as being examples of variants to the illustrated examples of tents 100 shown in FIGS. 1-7*b*.

Tents 200 and 300 may be configured such that the ends 11 of each support frame 10 are supported on polygonal base surface 30 and/or a ground surface such that two vertices 33 of the plurality of vertices defining polygonal base surface 30 are skipped, or between, the ends 11 of each support frame. For example, the polygonal base surface 30 may be an m-sided polygon (where "m" is an even integer), and m/2 or fewer support frames 10 may be arranged with an interval of two different vertices being skipped between adjacent ends 11 of each support frame 10. As more specific examples, the polygonal base surface 30 may be a polygon with six sides, eight sides, 10 sides, 12 sides, 14 sides, 16 sides, 18 sides, 20 sides, 24 sides, or more than 24 sides, and the tent 100 may include three support frames 10, four support frames 10, five support frames 10, six support frames 10, seven support frames 10, eight support frames 10, nine support frames 10, 10 support frames 10, 11 support frames 10, 12 support frames 10, or more than 12 support frames 10.

Referring to FIGS. 8*a* and 8*b*, a polygonal base surface 30 of the tent 200 has the form of an octagon, and two ends of each support frame 10 are positioned on vertices 33 of the polygonal base surface 30 such that two of the vertices of the polygonal base surface 30 are positioned between the two ends. Referring to FIGS. 9*a* and 9*b*, a polygonal base surface 30 has the form of a hexadecagon (i.e., a 16-sided polygon), and two ends of each support frame 10 are positioned on vertices 33 of the polygonal base surface 30 such that two of the vertices of the polygonal base surface 30 are positioned between the two ends.

The tents 200 and 300 described in FIGS. 8*a* to 9*b* are different from the specific embodiments of the tent 100 shown in FIGS. 1 and 2 in that the two ends of each support frame 10 are spaced apart and positioned on vertices 33 of the polygonal base surface 30 such that two of the vertices 33 of the polygonal base surfaces 30 are positioned between the two ends. In addition, tents 200 and 300 provide examples of tents in which each vertex 33 of the polygonal base surface 30 only supports or receives one end of one of the support frames 10 forming assembled tent frame 12. Tent 300 also provides a graphical example of a tent in which polygonal base surface 30 does not define a regular polygon, as the lengths of the sides of the polygonal base surface are not equal. Despite these differences, but as discussed herein, tents 200 and 300 optionally may include other features, elements, and/or variants that are described herein, such as tent fabric 20, a roof 40, one or more fixing members 60, a plurality of connecting rings 25, one or more reinforcing cords 16, a center pole 50, and/or one or more cross frame(s) 70.

The tents 100 described and illustrated herein are not limited to the configuration and method of the embodiments described above, and some or all of the embodiments may be selectively combined to make various modifications thereto.

Examples of tents according to the present disclosure are presented in the following enumerated paragraphs.

A1. A tent, comprising:

a plurality of support frames that form an assembled tent frame when the tent is assembled, wherein the assembled tent frame bounds a polygonal base surface having a plurality of vertices;

wherein each support frame of the assembled tent frame is bent in a shape of an arch and has two ends that are supported on a ground surface when the tent is assembled;

wherein each support frame of the assembled tent frame crosses over at least one other support frame; and wherein each support frame of the assembled tent frame is positioned such that the ends of the support frame are positioned on non-adjacent vertices of the polygonal base surface.

A2. The tent according to paragraph A1, wherein the plurality of support frames is interconnected to form the assembled tent frame when the tent is assembled.

A3. The tent according to any of paragraphs A1-A2, wherein each support frame crosses over at least two other support frames of the assembled tent frame.

A4. The tent according to any of paragraphs A1-A3, wherein the plurality of support frames forming the assembled tent frame defines the shape of the polygonal base surface.

A5. The tent according to any of paragraphs A1-A4, wherein the polygonal base surface has a shape defined by imaginary lines connecting the ends of the support frames forming the assembled tent frame.

A6. The tent according to any of paragraphs A1-A5, wherein the ends of each support frame forming the assembled tent frame are positioned at an interval of at least one vertex of the polygonal base surface.

A7. The tent according to paragraph A6, wherein the ends of each support frame forming the assembled tent frame are positioned at an interval of only one vertex of the polygonal base surface.

A8. The tent according to paragraph A6, wherein the ends of each support frame forming the assembled tent frame are positioned at an interval of two vertices of the polygonal base surface.

A9. The tent according to paragraph A6, wherein the ends of each support frame forming the assembled tent frame are positioned at an interval of more than two vertices of the polygonal base surface.

A10. The tent according to any of paragraphs A1-A6, wherein the ends of each support frame forming the assembled tent frame are positioned such that at least one vertex of the polygonal base surface is between the vertices on which the ends of the support frame are positioned.

A11. The tent according to paragraph A10, wherein the ends of each support frame forming the assembled tent frame are positioned such that only one vertex of the polygonal base surface is between the vertices on which the ends of the support frame are positioned.

A12. The tent according to paragraph A10, wherein the ends of each support frame forming the assembled tent frame are positioned such that two vertices of the polygonal base surface are between the vertices on which the ends of the support frame are positioned.

A13. The tent according to paragraph A10, wherein the ends of each support frame forming the assembled tent frame are positioned such that more than two vertices of the polygonal base surface are between the vertices on which the ends of the support frame are positioned.

A14. The tent according to any of paragraphs A1-A13, wherein each support frame is in a shape of an arch bulging upwards when the tent is assembled.

A15. The tent according to any of paragraphs A1-A14, wherein two of the plurality of support frames intersect at a vertex of the polygonal base surface.

A16. The tent according to any of paragraphs A1-A15, wherein an end of two of the plurality of support frames intersect at a vertex of the polygonal base surface.

A17. The tent according to any of paragraphs A1-A16, wherein an end of two different support frames of the plurality of support frames are positioned at each vertex of the polygonal base surface when the tent is assembled.

A18. The tent according to any of paragraphs A1-A17, wherein the polygonal base surface includes a center region, and further wherein none of the plurality of support frames extend above the center region of the polygonal base surface.

A19. The tent according to paragraph A18, wherein the center region of the polygonal base surface includes a center-most 15% of the area of the polygonal base surface.

A20. The tent according to paragraph A18, wherein the center region of the polygonal base surface includes a center-most 25% of the area of the polygonal base surface.

A21. The tent according to paragraph A18, wherein the center region of the polygonal base surface includes a center-most 40% of the area of the polygonal base surface.

A22. The tent according to paragraph A18, wherein the center region of the polygonal base surface includes a center-most 50% of the area of the polygonal base surface.

A23. The tent according to paragraph A18, wherein the center region of the polygonal base surface includes a center-most 60% of the area of the polygonal base surface.

A24. The tent according to paragraph A18, wherein the center region of the polygonal base surface includes a center-most 75% of the area of the polygonal base surface.

A25. The tent according to any of paragraphs A1-A24, wherein the polygonal base surface is a regular polygon.

A26. The tent according to any of paragraphs A1-A25, wherein the polygonal base surface has at least five sides.

A27. The tent according to any of paragraphs A1-A26, wherein the polygonal base surface has at least ten sides.

A28. The tent according to any of paragraphs A1-A27, wherein the polygonal base surface has at least sixteen sides.

A29. The tent according to any of paragraphs A1-A25, wherein the polygonal base surface is a polygon that has at least five sides and at most twenty-four sides.

A30. The tent according to any one of paragraphs A-A25, wherein the polygonal base surface is an n-sided polygon, where n is an integer; wherein the plurality of support frames includes at most n support frames; and wherein each support frame is positioned such that the ends of the support frame are positioned on the vertices of the polygonal base surface such that one of the vertices of the polygonal base surface is positioned between the two ends.

A31. The tent according to any one of paragraphs A1-A30, wherein the polygonal base surface is an m-sided polygon, where m is an even number; wherein the plurality of support frames includes at most m/2 support frames; and wherein each support frame is positioned such that the ends of the support frame are positioned on the vertices of the polygonal base surface such that two of the vertices of the polygonal base surface are positioned between the two ends.

A32. The tent according to any of paragraphs A1-A31, wherein the polygonal base surface is a region of a ground surface upon which the assembled tent is supported.

A33. The tent according to any of paragraphs A1-A31, wherein the polygonal base surface is a surface that is positioned on a ground surface upon which the tent is supported.

A34. The tent according to any of paragraphs A1-A33, wherein the polygonal base surface is coextensive with a perimeter defined by the assembled tent frame.

A35. The tent according to any of paragraphs A1-A34, further comprising at least one fixing member configured to bind two overlapping support frames to one another at an intersection of the two overlapping support frames.

A36. The tent according to paragraph A35, wherein the intersection is in an arched region of the overlapping support frames.

A37. The tent according to any of paragraphs A35-36, wherein each fixing member is configured to be repeatedly coupled to and removed from the two overlapping support frames.

A38. The tent according to any of paragraphs A35-37, wherein the fixing member comprises a first member having a first receiving part in which a first support frame of the plurality of support frames is received to fixedly couple the first support frame within the first receiving part, and a second receiving part in which a second support frame of the plurality of support frames is received, and further wherein the fixing member comprises a second member that is pivotally coupled to the first member to fixedly couple the second support frame within the second receiving part.

A39. The tent according to paragraph A38, wherein the fixing member further comprises a third member that is configured to position the second support frame relative to the second receiving part; and further wherein the second member has a receiving groove in which the third member is received when the second member fixedly couples the second support frame within the second receiving part.

A40. The tent according to paragraph A38 or A39, wherein the first member has a pressing hole that is in communication with the first receiving part, and wherein a pressing member is installed in the pressing hole to press-fix the first support frame within the first receiving part.

A41. The tent according to any of paragraphs A38-A40, wherein the second member has a coupling protrusion at one end, and wherein the first member has a stopper groove into which the coupling protrusion is inserted when the second member fixedly couples the second support frame within the second receiving part.

A42. The tent according to any of paragraphs A1-A41, further comprising a tent fabric.

A43. The tent according to paragraph A42, wherein the tent fabric covers a space between the support frames of the assembled tent frame.

A44. The tent according to any of paragraphs A42-43, wherein the tent fabric is supported by the assembled tent frame.

A45. The tent according to any of paragraphs A42-44, wherein the tent fabric is connected to the assembled tent frame.

A46. The tent according to paragraph A45, wherein the tent further includes a plurality of connecting rings that connect the support frames of the assembled tent frame to the tent fabric.

A47. The tent according to any of paragraphs A42-46, wherein the tent fabric extends over the polygonal base surface of the tent.

A48. The tent according to any of paragraphs A1-A47, further comprising:

a reinforcing cord configured to connect at least two support frames of the assembled tent frame.

A49. The tent according to paragraph A48, wherein the reinforcing cord is a resilient reinforcing cord.

A50. The tent according to any of paragraphs A48-A49, wherein the reinforcing cord is an elastomeric reinforcing cord.

A51. The tent according to any of paragraph A1-A50, further comprising a center pole which is positioned within the assembled tent frame and extends upwardly from the polygonal base surface.

A52. The tent according to paragraph A51, wherein the center pole extends above the assembled tent frame.

A53. The tent according to paragraph A51 or A52, wherein the center pole extends from a center of the polygonal base surface.

A54. The tent according to any of paragraphs A51-A53, wherein the tent further includes a roof, and further wherein the center pole supports the roof of the tent.

A55. The tent according to paragraph A54, wherein the center pole supports the roof of the tent above the assembled tent frame.

A56. The tent according to any of paragraphs A1-A55, further comprising at least one cross frame that extends from a vertex of the polygonal base surface to an opposite vertex of the polygonal base surface; wherein the cross frame is bent in a shape of an arch.

A57. The tent according to paragraph A56, wherein the at least one cross frame includes at least two cross frames.

A58. The tent according to paragraph A57, wherein the at least two cross frames intersect above a/the center region of the polygonal base surface.

A59. The tent according to paragraph A57, wherein the at least two cross frames intersect above a/the center region of the polygonal base surface, and wherein the plurality of support frames do not intersect above the center region of the polygonal base surface.

A60. An assembled tent according to any of paragraphs A1-A59.

The present disclosure may be embodied in any other specific form without departing from the spirt and essential feature of the present disclosure. Therefore, it should be noted that the detailed description is for illustration only, but not intended to be limiting in all aspects. The scope of the present disclosure should be determined by the reasonable interpretation of the appended claims, and the scope of the present disclosure covers all modifications made within the equivalent scope of the present disclosure.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein, "selective" and "selectively," when modifying an action, movement, configuration, or other activity of one or more components or characteristics of a tent according to the present disclosure, means that the specified action, movement, configuration, or other activity is a direct or indirect result of user manipulation of an aspect of, or one or more components of, the tent.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The invention claimed is:

1. A tent, comprising:
a plurality of support frames that form an assembled tent frame when the tent is assembled, wherein the assembled tent frame bounds a polygonal base surface having a plurality of vertices;
wherein each support frame of the assembled tent frame is bent in a shape of an arch and has two ends that are supported on a ground surface when the tent is assembled;
wherein each support frame of the assembled tent frame crosses over at least one other support frame of the assembled tent frame and fewer than all of the other support frames of the assembled tent frame;
wherein each support frame of the assembled tent frame is positioned such that the ends of the support frame are positioned on non-adjacent vertices of the polygonal base surface;
wherein the polygonal base surface is an m-sided polygon, where m is an even number; wherein the plurality of support frames includes at most m/2 support frames; and wherein each support frame is positioned such that the ends of the support frame are positioned on the vertices of the polygonal base surface such that two of the vertices of the polygonal base surface are positioned between the two ends; and
wherein the polygonal base surface includes a center region, wherein the center region of the polygonal base surface includes a center-most 50% of the area of the polygonal base surface, and further wherein the assembled tent frame does not extend above the center region of the polygonal base surface.

2. The tent of claim 1, wherein each support frame crosses over at least two other support frames of the assembled tent frame.

3. The tent of claim 1, wherein the plurality of support frames forming the assembled tent frame defines the shape of the polygonal base surface.

4. The tent according to claim 1, wherein the ends of each support frame forming the assembled tent frame are positioned at an interval of only two vertices of the polygonal base surface.

5. The tent according to claim 1, wherein the center region of the polygonal base surface includes a center-most 75% of the area of the polygonal base surface.

6. The tent according to claim 1, further comprising at least one fixing member configured to bind two overlapping support frames to one another at an intersection of the two overlapping support frames, wherein the fixing member comprises a first member having a first receiving part in which a first support frame of the plurality of support frames is received to fixedly couple the first support frame within the first receiving part, and a second receiving part in which a second support frame of the plurality of support frames is received, and further wherein the fixing member comprises a second member that is pivotally coupled to the first member to fixedly couple the second support frame within the second receiving part.

7. The tent according to claim 6, wherein the fixing member further comprises a third member that is configured to position the second support frame relative to the second receiving part; and further wherein the second member has a receiving groove in which the third member is received when the second member fixedly couples the second support frame within the second receiving part.

8. The tent according to claim 6, wherein the first member has a pressing hole that is in communication with the first receiving part, and wherein a pressing member is installed in the pressing hole to press-fix the first support frame within the first receiving part.

9. The tent according to claim 6, wherein the second member has a coupling protrusion at one end, and wherein the first member has a stopper groove into which the coupling protrusion is inserted when the second member fixedly couples the second support frame within the second receiving part.

10. The tent according to claim 1, further comprising a tent fabric supported by the assembled tent frame, wherein the tent fabric extends over the polygonal base surface of the tent.

11. The tent according to claim 1, further comprising a reinforcing cord configured to connect at least two support frames of the assembled tent frame, wherein the reinforcing cord is at least one of a resilient reinforcing cord and an elastomeric reinforcing cord.

12. The tent according to claim 1, wherein the plurality of support frames of the assembled tent frame define a plurality of ends, and wherein only one end of the plurality of ends is positioned at each vertex of the plurality of vertices.

13. A tent, comprising:
a plurality of support frames that form an assembled tent frame when the tent is assembled, wherein the assembled tent frame bounds a polygonal base surface having a plurality of vertices;
wherein each support frame of the assembled tent frame is bent in a shape of an arch and has two ends that are supported on a ground surface when the tent is assembled;
wherein each support frame of the assembled tent frame crosses over at least one other support frame of the assembled tent frame and fewer than all of the other support frames of the assembled tent frame; and
wherein each support frame of the assembled tent frame is positioned such that the ends of the support frame are positioned on non-adjacent vertices of the polygonal base surface, and wherein an end of two different support frames of the plurality of support frames are positioned at each vertex of the polygonal base surface when the tent is assembled; and
at least one fixing member configured to bind two overlapping support frames to one another at an intersection of the two overlapping support frames, wherein the fixing member comprises a first member having a first receiving part in which a first support frame of the plurality of support frames is received to fixedly couple the first support frame within the first receiving part, and a second receiving part in which a second support frame of the plurality of support frames is received, and further wherein the fixing member comprises a second member that is pivotally coupled to the first member to fixedly couple the second support frame within the second receiving part.

14. The tent according to claim 13, wherein the fixing member further comprises a third member that is configured to position the second support frame relative to the second receiving part; and further wherein the second member has a receiving groove in which the third member is received when the second member fixedly couples the second support frame within the second receiving part.

15. The tent according to claim 13, wherein the first member has a pressing hole that is in communication with the first receiving part, and wherein a pressing member is installed in the pressing hole to press-fix the first support frame within the first receiving part.

16. The tent according to claim 13, wherein the second member has a coupling protrusion at one end, and wherein the first member has a stopper groove into which the coupling protrusion is inserted when the second member fixedly couples the second support frame within the second receiving part.

17. The tent according to claim 13, wherein the polygonal base surface is an n-sided polygon, where n is an integer; wherein the plurality of support frames includes at most n support frames; and wherein each support frame is positioned such that the ends of the support frame are positioned on the plurality of vertices of the polygonal base surface such that one of the vertices of the polygonal base surface is positioned between the two ends.

18. The tent according to claim 13, wherein the polygonal base surface includes a center region, wherein the center region of the polygonal base surface includes a center-most 50% of the area of the polygonal base surface, and further wherein none of the plurality of support frames extend above the center region of the polygonal base surface.

19. The tent according to claim 13, further comprising a center pole that is positioned within the assembled tent frame and extends upwardly from a center-most region of the polygonal base surface, wherein the tent further includes a roof, and further wherein the center pole supports the roof of the tent.

20. The tent according to claim 13, further comprising at least two cross frames, wherein the plurality of support frames forming the assembled tent frame defines the shape of the polygonal base surface, wherein each cross frame has two ends that are supported on the polygonal base surface, wherein each cross frame is bent in a shape of an arch, and further wherein the at least two cross frames intersect above a center region of the polygonal base surface.

21. The tent according to claim 20, wherein the two ends of each cross frame are positioned at vertices of the polygonal base surface.

22. A tent, comprising:
a plurality of support frames that form an assembled tent frame when the tent is assembled, wherein the assembled tent frame bounds a polygonal base surface having a plurality of vertices;
wherein each support frame of the assembled tent frame is bent in a shape of an arch and has two ends that are supported on a ground surface when the tent is assembled;
wherein each support frame of the assembled tent frame crosses over at least one other support frame of the assembled tent frame and fewer than all of the other support frames of the assembled tent frame, and wherein each support frame of the assembled tent frame crosses over fewer than half of the other support frames of the assembled tent frame;
wherein each support frame of the assembled tent frame is positioned such that the ends of the support frame are positioned on non-adjacent vertices of the polygonal base surface; and
wherein the polygonal base surface is an m-sided polygon, where m is an even number; wherein the plurality of support frames includes at most m/2 support frames; and wherein each support frame is positioned such that the ends of the support frame are positioned on the vertices of the polygonal base surface such that two of the vertices of the polygonal base surface are positioned between the two ends.

\* \* \* \* \*